United States Patent [19]

Fukawa et al.

[11] Patent Number: 4,525,546

[45] Date of Patent: Jun. 25, 1985

[54] PROCESS FOR PRODUCING POLYETHYLENE AND AN ETHYLENE-α-OLEFIN COPOLYMER

[75] Inventors: Isaburo Fukawa, Fuji; Kazutoshi Sato, Kurashiki, both of Japan

[73] Assignee: Asahi Kasei Kogyo Kabushiki Kaisha, Osaka, Japan

[21] Appl. No.: 552,564

[22] Filed: Nov. 16, 1983

[30] Foreign Application Priority Data

Nov. 29, 1982 [JP] Japan ................................. 57-207762
Nov. 30, 1982 [JP] Japan ................................. 57-208490
Jan. 11, 1983 [JP] Japan ..................................... 58-1746
Jan. 11, 1983 [JP] Japan ..................................... 58-1748
Sep. 13, 1983 [JP] Japan ................................ 58-167524

[51] Int. Cl.³ .......................... C08F 6/02; C08F 10/02
[52] U.S. Cl. .......................................... 526/68; 526/84; 528/485; 528/486; 528/491
[58] Field of Search ................... 526/84, 68; 528/485, 528/486, 491

[56] References Cited

U.S. PATENT DOCUMENTS

| | | | |
|---|---|---|---|
| 3,627,740 | 12/1971 | Schafer et al. | 526/84 |
| 4,105,609 | 8/1978 | Machon et al. | |
| 4,330,646 | 5/1982 | Sakurai et al. | 526/128 |
| 4,381,252 | 4/1983 | Sakurai et al. | 526/128 |
| 4,425,464 | 1/1984 | Allen et al. | 526/125 |
| 4,430,488 | 2/1984 | Zboril | 526/84 |

FOREIGN PATENT DOCUMENTS

| | | |
|---|---|---|
| 0062127 | 10/1982 | European Pat. Off. . |
| 0067645 | 12/1982 | European Pat. Off. . |
| 52-69488 | 9/1977 | Japan ........................... 526/486 |
| 58-145708 | 8/1983 | Japan ............................. 526/84 |
| 2104083 | 3/1983 | United Kingdom ............... 526/84 |

*Primary Examiner*—Edward J. Smith
*Attorney, Agent, or Firm*—Sprung Horn Kramer & Woods

[57] ABSTRACT

Polyethylene and an ethylene-α-olefin copolymer are produced by polymerizing ethylene or a mixture of ethylene with an α-olefin having 3 to 18 carbon atoms by use of a coordination polymerization catalyst containing a transition metal compound and an organometallic compound, deactivating said catalyst by adding a copolymer of at least one monomer selected from the group consisting of vinyl monomers having a carbonyl group represented by the formula:

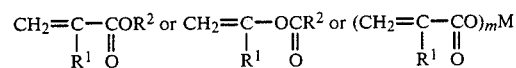

wherein $R^1$ represents a hydrogen atom or a hydrocarbon group having 1 to 5 carbon atoms; $R^2$ is a hydrogen atom or a hydrocarbon group having 1 to 20 carbon atoms; M represents a metal element; and m represents the valence of M, or maleic anhydride with ethylene to be mixed with said catalyst, separating unaltered monomers from the polymer mixture.

8 Claims, No Drawings

PROCESS FOR PRODUCING POLYETHYLENE AND AN ETHYLENE-α-OLEFIN COPOLYMER

BACKGROUND OF THE INVENTION

1. Field of the Invention

This invention relates to a process for producing polyethylene and an ethylene-α-olefin copolymer, particularly to deactivation of a coordination polymerization catalyst to be used for polymerization of ethylene and α-olefins.

2. Description of the Prior Arts

Polyethylene and an ethylene-α-olefin copolymer polymerized by use of a coordination polymerization catalyst have generally a broad range of densities from 0.850 to 0.975 g/cm³, and utilized in large amounts for a wide variety of uses, including, for example films, blow moldings, fibers, extruded articles, etc.

As the catalyst for polymerization of ethylene or a mixture of ethylene with α-olefin, coordination polymerization catalysts have been known. Coordination polymerization catalysts include transition metal compounds belonging to the groups IV to VIII of the periodic table, typically of titanium, vanadium, chromium and molybdenum, and organometallic compounds such as organic aluminum compounds as principal constituting components.

Various processes have been known for polymerization of ethylene and a mixture of ethylene with an α-olefin. Among them, the solution polymerization process, in which polymerization is conducted at a high polymerization temperature of 130° C. or higher or the high temperature high pressure ionic polymerization process using no solvent, which enables adiabatic polymerization of ethylene, is an excellent energy-saving process, since no energy is required for removal of polymerization heat, as different from the slurry polymerization process and the gas-phase polymerization process.

In recent years, high activity coordination polymerization catalysts have been developed, and the polymers obtained by use thereof are very small in quantity of the catalyst residue in the polymer even without removal of the catalyst residue in the polymer by extraction or neutralization with an alcohol or a caustic soda, and comparable in color or heat stability to the polymers of the prior art applied with removal of catalysts. When there is a process for removing a catalyst, the polymerization solvent and the unaltered monomers recovered cannot be used as such for polymerization, because they are in contact with polar compounds such as alcohols, but these polar compounds are required to be separated in the purification step. On the other hand, when a highly active catalyst is used, no polar compound such as an alcohol is employed, and therefore re-use of the polymerization solvent and the unaltered monomers may be possible without purifying a part or all of the polymerization solvent and unaltered monomers at all or only with treatment according a very simple purification step (e.g. passing through a molecular sieve), whereby enormous amounts of energy such as steam required for distillation purification can be saved.

However, in a process of high temperature polymerization with a coordination polymerization catalyst, polymerization rate is very high. Hence, if the step for removal of the catalyst is omitted, the catalyst is not deactivated and polymerization after emerging from the reactor, namely post-polymerization will occur. Post-polymerization, which will generally occur at a polymerization temperature higher than the average temperature in the polymerization reactor, is a cause for formation of undesirable low molecular weight oligomers, waxes and greases. Oligomers such as butene-1, hexene-1 and the like may cause lowering in density during preparation of ethylene homopolymers.

On the other hand, in a high temperature high pressure ionic polymerization process, polymerization conversion of ethylene is as low as 10 to 30%, and a large amount of unaltered monomers exist in the polymer emerging from the polymerization reactor, which will undergo polymerization with no reaction control when the catalyst is not deactivated, whereby there is involved a great risk of causing a runaway reaction.

Japanese Laid-open Patent Publication No. 111282/1976 discloses a proposal to use an aliphatic acid metal salt as the deactivator for the high temperature, high pressure ionic polymerization process, and also the same aliphatic acid metal salt is proposed to be used as the deactivator for the solution polymerization process in Japanese Laid-open Patent Publication No. 121004/1982.

However, when an aliphatic acid metal salt is used as the deactivator and the polymerization solvent and unaltered monomers recovered from polymer solution are used repeatedly without purification for a long term, the polymerization conversion is gradually lowered until polymerization occurs no longer. This is probably because the deactivator or decomposed products thereof, or the reaction products between the deactivator and the catalyst cannot sufficiently be separated in a separator downstream of the polymerization reactor, but entrained into the solvent and the unaltered monomers recovered to deactivate the activity of the catalyst.

SUMMARY OF THE INVENTION

The present inventors have made extensive studies to develop a deactivator which is not volatile per se, yet produces no volatile reaction product having a deleterious effect on the polymerization system after the contact with the catalysts and is also free from fear of contamination of recovered monomers or solvent, and consequently accomplished the present invention. Of course, since the deactivator remains in the polymer, it should have no bad effect on the properties of the polymer, such as color, heat stability, physical properties, processability and others.

That is, the present invention relates to a process for producing polyethylene and an ethylene-α-olefin copolymer, which comprises polymerizing at an average polymerization temperature of 130° C. or more ethylene or a mixture of ethylene with an α-olefin having 3 to 18 carbon atoms by use of a coordination polymerization catalyst containing a transition metal compound and an organometallic compound, deactivating said catalyst by adding a copolymer of at least one monomer selected from the group consisting of vinyl monomers having a carbonyl group represented by the formula:

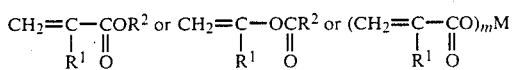

wherein $R^1$ represents a hydrogen atom or a hydrocarbon group having 1 to 5 carbon atoms; $R^2$ is a hydrogen atom or a hydrocarbon group having 1 to 20 carbon atoms; M represents a metal element; and m represents the valence of M, or maleic anhydride with ethylene in an amount sufficient to deactivate said catalyst in state of a solution or a suspension in an inert hydrocarbon or a pure solid or a molten state to be mixed with said catalyst, separating unaltered monomers or unaltered monomers and the inert hydrocarbon solvent from the polymer mixture and obtaining the polymer containing said deactivator and the reaction product of said deactivator with said catalyst.

DETAILED DESCRIPTION OF THE INVENTION

In the coordination polymerization catalyst to be used in the present invention, a transition metal compound and an organometallic compound are contained as the principal constituents. As the transition metal compound, there may be employed, for example, a halide of a transition metal of the group IV to the group VIII such as titanium halide, vanadium halide, vanadium oxyhalide and the like or an oxide of a transition metal of the group IV to group VIII such as chromium trioxide, molybdenum trioxide and the like. As the organometallic compound, there may be employed an organic aluminum compound such as alkyl aluminum, alkyl aluminum chloride and the like, or an organic aluminum-magnesium complex such as alkyl aluminum-magnesium complex, alkylalkoxy aluminum-magnesium complex and the like.

The coordination polymerization catalyst to be used in the present invention must have a sufficiently high activity, requiring no removal of the catalyst, and it must also be deactivated rapidly through the reaction with the deactivator of the present invention. As the catalyst consistent with these demands to be used in the present invention, there may be included the Ziegler type catalysts, the catalysts in which Phillips type catalysts and organometallic compounds are combined, the catalysts in which Standard type catalysts are combined with organometallic compounds, etc. As an example of a preferable catalyst, there is a catalyst comprising a solid reaction product, obtained by the reaction between an organic magnesium compound and a titanium compound or a vanadium compound, and an organic aluminum compound, as disclosed in Japanese Laid-open Patent Publication No. 47409/1981 or No. 59806/1981.

More specifically, Japanese Laid-open Patent Publication No. 47409/1981 discloses a catalyst, comprising:

(A) a solid reaction product prepared by allowing an organic magnesium component soluble in a hydrocarbon solvent represented by the formula (i) $M_\alpha Mg_\beta R^1_p R^2_q X^1_r X^2_s$ [wherein M is Al, Zn, B, Be, or Li; $\beta$ is a number of 1 or more; $\alpha$, p, q, r and s each is 0 or a number greater than 0, having the relations of $p+q+r+s=m\alpha+2\beta$, and $0 \leq (r+s)/(\alpha+\beta) \leq 1.0$; m is the valence of M; $R^1$ and $R^2$ are hydrocarbon groups having 1 to 20 carbon atoms, which may be either identical or different; $X^1$ and $X^2$, which may be identical or different, represent hydrogen atoms, or groups of $OR^3$, $OSiR^4R^5R^6$, $NR^7R^8$ or $SR^9$ (wherein $R^3$, $R^7$, $R^8$ and $R^9$ represent hydrocarbon groups having 1 to 20 carbon atoms, and $R^4$, $R^5$ and $R^6$ represent hydrogen atoms or hydrocarbon groups having 1 to 20 carbon atoms)] to react with a titanium compound of the formula (ii) Ti(OR$^{10}$)$_n$X$_{4-n}$ [wherein R$^{10}$ is a hydrocarbon group having 1 to 20 carbon atoms; X is a halogen; and $0 \leq n \leq 3$] at a molar ratio of the titanium compound (ii) to the organic magnesium component (i) of 1.1 to 4.0, and (B) an organic aluminum compound.

Also, Japanese Laid-open Patent Publication No. 59806/1981 discloses a catalyst, comprising:

(A) a solid catalyst prepared by allowing a solid reaction product between an organic magnesium component soluble in a hydrocarbon solvent represented by the formula (i) $M_\alpha Mg_\beta R^1_p R^2_q X^1_r X^2_s$ [wherein M is Al, Zn, B, Be, or Li; $\beta$ is a number of 1 or more; $\alpha$, p, q, r and s each is 0 or a number greater than 0, having the relations of $p+q+r+s=m\alpha+2\beta$, and $0 \leq (r+s)/(\alpha+\beta) \leq 1.0$; m is the valence of M; $R^1$ and $R^2$ are hydrocarbon groups having 1 to 20 carbon atoms, which may be either identical or different; $X^1$ and $X^2$, which may be identical or different, represent hydrogen atoms, or groups of $OR^3$, $OSiR^4R^5R^6$, $NR^7R^8$ or $SR^9$ (wherein $R^3$, $R^7$, $R^8$ and $R^9$ represent hydrocarbon groups having 1 to 20 carbon atoms, and $R^4$, $R^5$ and $R^6$ represent hydrogen atoms or hydrocarbon groups having 1 to 20 carbon atoms)] and (ii) a titanium compound containing at least one halogen atom to react with at least one compound selected from the titanium and vanadium compounds represented by the formula (iii) TiX$_a$(OR$^{10}$)$_{4-a}$, VOX$_b$(OR$^{10}$)$_{3-b}$ and VX$_c$(OR$^{10}$)$_{4-c}$ (wherein X is a halogen atom, R$^{10}$ is a hydrocarbon group having 1 to 20 carbon atoms, a is 1 to 4, b is 1 to 3 and c is 1 to 4), and (B) an organic aluminum compound.

Other examples of preferable catalysts to be used in the present invention may include those disclosed in Japanese Laid-open Patent Publications Nos. 26905; 28206; 32504; 45910; 47408; and No. 59805/1981; and No. 16005/1982.

One example is a catalyst, comprising a catalyst component [A] having a reaction product between an organic magnesium compound soluble in a hydrocarbon solvent represented by the formula (i) $M_\alpha MgR^1_p R^2_q X^1_r X^2_s D_t$ [wherein M is a metal atom of the group I to the group III of the periodic table; $\alpha$, p, q and r each is 0 or a number greater than 0, s is greater than 0 and not greater than 1, t is a number greater than 0; having the relations of $p+q+r+s=m\alpha+2$, $0<(r+s)/(\alpha+1) \leq 1.0$ and $s \leq t$; m is the valence of M; $R^1$ and $R^2$ are hydrocarbon groups having 1 to 20 carbon atoms, which may be either identical or different; $X^1$ is a hydrogen atom or an electro-negative group containing oxygen, nitrogen or sulfur atom; $X^2$ is a halogen atom; and D is an electron donating organic compound] and (ii) one or a mixture of two or more selected from hydrogen chloride, organic halides, halides of boron, aluminum, silicon, germanium, tin, lead, phosphorus, arsenic, antimony, bismuth, zinc, cadmium and mercury to be contacted with (iii) a titanium compound or/and a vanadium compound, and [B] an organometallic compound.

Another example is a catalyst, comprising a component [A] shown below and an organometallic compound [B]:

Component [A]: a solid catalyst, comprising a reaction product obtained from the reaction between (4) and (5) in the presence of (3):

(1) an organic magnesium compound represented by the formula: $M_\alpha MgR'_p X'_q \cdot D_r$ [wherein M is a metal atom of the group I to the group III of the periodic table; $\alpha$, p, q and r each is 0 or a number greater than 0, having the relations of $p+q=m\alpha+2$, $0 \leq q/(\alpha+1)<2$; m is the valence of M; R' is one kind or a mixture of two or more kinds of hydrocarbon groups having 1 to 20 carbon atoms, which may be either identical or different; X' is one kind or a mixture of two or more kinds of a hydrogen atom or an electro-negative group containing oxygen, nitrogen or sulfur atom; and D is an electron donating organic compound];

(2) at least one kind or a mixture of two or more kinds selected from halides of boron, silicon, germanium, tin, phosphorus, antimony, bismuth and zinc or hydrogen chloride;

(3) a solid component obtained by the reaction between (1) and (2);

(4) an organometallic compound;

(5) any of the transition metal compounds of (a)-(d) shown below:

(a) titanium compound, (b) vanadium compound, (c) titanium compound and vanadium compound, and (d) titanium compound and zirconium compound.

Still another example is a catalyst, comprising a catalyst component [A] having a reaction product between an organic magnesium compound soluble in a hydrocarbon solvent represented by the formula (i) $M_\alpha Mg_\beta R^1_p R^2_q X^1_r X^2_s D_t$ [wherein M is a metal atom of the group I to the group III of the periodic table; $\alpha$, p, q, r and s each is 0 or a number greater than 0, $\beta$ is a number greater than 0, having the relations of $p+q+r+s=m\alpha+2\beta$, $0 \leq (r+s)/(\alpha+\beta) \leq 1.0$; m is the valence of M; t is 0 or a number greater than 0; $R^1$ and $R^2$ are hydrocarbon groups having 1 to 20 carbon atoms, which may be either identical or different; $X^1$ and $X^2$ may be the same or different, and represent hydrogen atom or an electro-negative group containing oxygen, nitrogen or sulfur atom; and D is an electron donating organic compound] and (ii) one kind or a mixture of two or more kinds selected from hydrogen chloride, organic halides, halides of boron, aluminum, silicon, germanium, tin, lead, phosphorus, arsenic, antimony, bismuth, zinc, cadmium and mercury to be contacted with (iii) a titanium compound or/and a vanadium compound, and [B] an organometallic compound.

These catalysts as enumerated above have hydrocarbon groups in the transition metal catalyst components, and therefore have commonly the specific feature particularly in that they are readily reactive with the carbonyl groups in the deactivator, whereby deactivation can occur very rapidly.

As the α-olefins to be used in the present invention, there may be employed those having 3 to 18 carbon atoms, as exemplified by propylene, butene-1, pentene-1, hexene-1, 4-methylpentene-1, heptene-1, octene-1, nonene-1, decene-1 and the like, which can be used either as a single species or a mixture of two or more species.

Polymerization techniques available in the present invention carry out polymerization at a high temperature of 130° C. or higher. Representative of such techniques are, for example, the solution polymerization method in which ethylene or a mixture of ethylene with α-olefin is polymerized in the presence of an inert hydrocarbon solvent at an average polymerization temperature of 130° to 300° C. under a polymerization pressure of 10 to 500 atm.; and the high temperature, high pressure ionic polymerization method in which ethylene or a mixture of ethylene with α-olefin is polymerized by feeding a coordination polymerization catalyst in place of a radical catalyst to a low density polyethylene plant of the prior art at an average polymerization temperature of 130° to 300° C. under a polymerization pressure of 200 to 3,000 atm.

As the inert hydrocarbon to be used in the solution polymerization method, there may be included butane, pentane, hexane, cyclohexane, heptane, octane, isooctane, nonane, decane, dodecane and others. These solvents may be used either singly or as a mixture.

As a typical example of the solution polymerization method, there is a process as disclosed in Canadian Pat. No. 980498 issued to C. T. Elston on Dec. 28, 1975.

High temperature, high pressure ionic polymerization methods are inclusive of the autoclave method employing an autoclave reactor, the tubular method employing a tubular reactor and also various multi-stage polymerization methods in which polymerizations are conducted by combinations of autoclave and tubular reactors. An example of high temperature, high pressure ionic polymerization methods may be seen in British Pat. Nos. 932,231, 1,205,635 and U.S. Pat. No. 1,161,737.

The reaction mixture emerging from the polymerization reactor after completion of polymerization contains a polymer, unaltered monomers, the coordination polymerization catalyst a part of which is still active and the inert hydrocarbon solvent, when such a solvent is employed. In order to deactivate the catalyst for prevention of post-polymerization, a deactivator is mixed with the reaction mixture. Mixing may be practiced at a place which may be either before or after a reducing valve situated between the polymerization reactor and a polymer separator. As the method for mixing, the streams through the two pipes may be simply mixed by making into one stream. Alternatively, any other method may be available, so long as the catalyst can be rapidly contacted with the deactivator, such as the method in which mixing is conducted compulsorily by means of a mixer such as static mixer, in-line mixer, etc.

The amount of the deactivator added should be sufficient to deactivate assuredly the catalyst. Such a deactivation of the catalyst may be effected by deactivating at least one of the constituents of the catalyst, namely a transition metal compound and an organometallic compound. However, the amount of the deactivator should preferably be sufficient so that it can react with both constituents of the catalyst.

The amount of the deactivator to be used in the present invention is defined as having a number of carbonyl groups which is 0.4 to 20 times as much as the total molecules of the transition metal compound and the organometallic compound. At a level of a number of carbonyl groups less than 0.4-fold of the catalyst molecules, no sufficient deactivation can be effected, while a level in excess of 20-fold is not economical. The deactivator of the present invention, which is an ethylenic copolymer, is excellent in compatibility with polyethylene or an ethylene-α-olefin copolymer, and has a specific feature in that it has no bad influence on the polymer even when remaining in the polymer.

The deactivator to be used in the present invention is a copolymer of at least one kind of vinyl monomers having a carbonyl group represented by the formula:

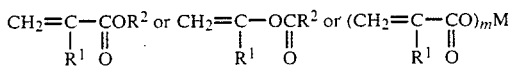

wherein $R^1$ represents a hydrogen atom or a hydrocarbon group having 1 to 5 carbon atoms; $R^2$ is a hydrogen atom or a hydrocarbon group having 1 to 20 carbon atoms; M represents a metal element; and m represents a valence of M,
or maleic anhydride with ethylene, preferably a copolymer of at least one kind of monomers of acrylic acid, methacrylic acid, acrylic acid metal salts, methacrylic acid metal salts, acrylic acid esters, methacrylic acid esters, vinyl carboxylate and maleic anhydride with ethylene. Further, copolymers of at least one kind of vinyl monomers of acrylic acid esters and methacrylic acid esters with ethylene are excellent in heat stability and small in generation of volatile decomposed products, and therefore may particularly preferably be used.

Acrylic acid, methacrylic acid, acrylic acid metal salts, methacrylic acid metal salts, acrylic acid esters, methacrylic acid esters, vinyl carboxylate and maleic anhydride may be represented by $H_2C=CHCOOH$, $H_2C=CCH_3COOH$, $(H_2C=CHCOO)_m M$, $(H_2C=CCH_3COO)_m M$, $H_2C=CHCOOR$, $H_2C=CCH_3COOR$,

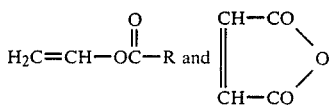

(wherein R is a hydrocarbon group having 1 to 20 carbon atoms; M is a metal, preferably a metal of the Group I or Group II of the periodic table, for example, lithium, sodium, potassium, calcium, magnesium, barium, zinc, etc.; and m is the valence of M), respectively, and they are monomers having carbonyl groups in the molecules.

The ethylene copolymer to be used as the deactivator should preferably have a molecular weight within the range from 3,000 to 500,000. A copolymer with a molecular weight of less than 3,000 is not desirable, since it tends to be vaporized together with the solvent recovered or unaltered monomers in a polymer separator downstream of the polymerization reactor. With a molecular weight of more than 500,000, the copolymer is insufficient in compatibility with the polymerized polymer, and may cause formation of fish eyes or gels. A copolymer with a melt index of 0.1 to 200 has a molecular weight within the preferred range as specified above.

The content of the carbonyl containing monomer units in the ethylene copolymer to be used as a deactivator may be 1% by weight or more, preferably 3% by weight or more. When its content is too low, it is required to use a large amount of the deactivator, which, however is not desirable as a process condition. Also, incorporation of a large amount of a deactivator will lead to lowering in density buring manufacturing of a high density polyethylene, since the ethylene copolymer for deactivator has generally a low density.

Examples of copolymers of ethylene with methacrylic acid esters may include ethylene-methyl methacrylate copolymer, ethylene-ethyl methacrylate copolymer, ethylene-butyl methacrylate copolymer, ethylene-isobutyl methacrylate copolymer, ethylene-pentyl methacrylate copolymer, ethylene-heptyl methacrylate copolymer, ethylene-octyl methacrylate copolymer, ethylene-nonyl methacrylate copolymer, ethylene-decyl methacrylate copolymer, ethylene-dodecyl methacrylate copolymer, ethylene-octadecyl methacrylate copolymer, ethylene-cyclohexyl methacrylate copolymer, ethylene-benzyl methacrylate copolymer, ethylene-tolyl methacrylate copolymer, ethylene-methyl methacrylate-ethyl methacrylate copolymer and the like. Among them, ethylene-methyl methacrylate copolymer which is inexpensive in the monomer cost is commercially preferred.

Examples of copolymers of ethylene with acrylic acid esters may include ethylene-ethyl acrylate copolymer, ethylene-methyl acrylate copolymer, ethylene-propyl acrylate copolymer, ethylene-butyl acrylate copolymer, ethylene-pentyl acrylate copolymer, ethylene-heptyl acrylate copolymer, ethylene-octyl acrylate copolymer, ethylene-nonyl acrylate copolymer, ethylene-decyl acrylate copolymer, ethylene-dodecyl acrylate copolymer, ethylene-octadecyl acrylate copolymer, ethylene-cyclohexyl acrylate copolymer, ethylene-benzyl acrylate copolymer, ethylene-tolyl acrylate copolymer, ethylene-ethyl acrylate-methyl acrylate copolymer and the like. Among them, ethylene-ethyl acrylate copolymer which is excellent in heat stability is preferred.

The ternary copolymer of ethylene, a methacrylic acid ester and an acrylic acid ester may be exemplified by ethylene-methyl methacrylate-ethyl acrylate ternary copolymer, ethylene-ethyl methacrylate-methyl acrylate ternary copolymer, ethylene-ethyl methacrylate-ethyl acrylate ternary copolymer, and the like.

As other examples of copolymers of ethylene with unsaturated carboxylic acid esters, there may be included ethylene-methyl 2-ethylacrylate copolymer, ethylene-ethyl 2-ethylacrylate copolymer, ethylene-decyl 2-ethyl-acrylate copolymer, ethylene-octadecyl 2-ethyl-acrylate copolymer, ethylene-methyl 2-pentylacrylate copolymer, ethylene-ethyl 2-pentylacrylate copolymer, ethylene-decyl 2-pentylacrylate copolymer, ethylene-octadecyl 2-pentylacrylate copolymer and the like.

The copolymers of ethylene with alkenyl carboxylates may include, for example, ethylene vinyl acetate copolymer (generally called as EVA), ethylene-vinyl propionate copolymer, ethylene-vinyl butyrate copolymer, ethylene-vinyl valerate copolymer, ethylene-vinyl caprate copolymer, ethylene-vinyl stearate copolymer, ethylene-α-methylvinyl acetate copolymer, ethylene-α-ethylvinyl acetate copolymer, ethylene-α-butylvinyl acetate copolymer, ethylene-α-methylvinyl caprate copolymer, ethylene-α-butylvinyl caprate copolymer, ethylene-α-methylvinyl stearate copolymer, ethylene-vinyl acetate-ethyl acrylate ternary copolymer, ethylene-vinyl acetate-methyl methacrylate ternary copolymer and the like.

The ethylene copolymers as enumerated above can be prepared according to any of the methods known in the art. As one example, there may be employed the method in which ethylene and at least one polar compound of a methacrylic acid ester, an acrylic acid ester and a vinyl carboxylate are fed into a polyethylene polymerizing device of high pressure method, and radical polymerization is carried out under a polymerization pressure of 1,000 to 4,000 atm. at 150° to 300° C. to obtain said copolymer. It is also possible to employ the method in which radical polymerization is conducted according to the emulsion polymerization system under a lower pressure than that as mentioned above.

Copolymers of ethylene and maleic anhydride are known as EMA resins, and they can be prepared according to any of the methods known in the art. For example, they can be prepared according to conventional radical polymerization or γ-ray polymerization, etc.

As the copolymer of ethylene with at least one vinyl monomer of methacrylic acid, acrylic acid, methacrylic acid metal salt, acrylic acid metal salt, acrylic acid ester and methacrylic acid ester, there may be employed ethylene-sodium methacrylate copolymer, ethylene-methacrylic acid-sodium methacrylate copolymer, ethylene-potassium methacrylate copolymer, ethylene-methacrylic acid-potassium methacrylate copolymer, ethylene-calcium methacrylate copolymer, ethylene-methacrylic acid-calcium methacrylate copolymer, ethylene-magnesium methacrylate copolymer, ethylene-methacrylic acid-magnesium methacrylate copolymer, ethylene-zinc methacrylate copolymer, ethylene-methacrylic acid-zinc methacrylate copolymer, ethylene-methyl methacrylate-methacrylic acid-sodium methacrylate copolymer, ethylene-methyl methacrylate-methacrylic acid-zinc methacrylate copolymer, ethylene-sodium acrylate-sodium methacrylate copolymer, ethylene-sodium acrylate copolymer, ethylene-acrylic acid-sodium acrylate copolymer, ethylene-potassium acrylate copolymer, ethylene-acrylic acid-potassium acrylate copolymer, ethylene-calcium acrylate copolymer, ethylene-acrylic acid-zinc acrylate copolymer, ethylene-ethyl acrylate-acrylic acid-sodium acrylate copolymer, ethylene-potassium 2-pentylacrylate copolymer, ethylene-2-pentyl acrylic acid-calcium 2-pentylacrylate copolymer and the like. The content (moles) of acrylic acid or methacrylic acid units in these copolymers should preferably be not more than equal to that (moles) of acrylic acid metal salt or methacrylic acid metal salt.

These copolymers containing metal salts are known as ionomers, and all the methods for production of these copolymers known in the art may be available. For example, according to a conventional high pressure radical polymerization, ethylene and acrylic acid or ethylene and methacrylic acid may be copolymerized, and the resultant copolymer neutralized through the reaction with the carboxylic acid groups in the copolymer with a metal hydroxide to prepare an ionomer. Alternatively, it can also be prepared by hydrolyzing the ester portion of the copolymer obtained by copolymerization of ethylene with methacrylic acid ester or acrylic acid ester, followed by neutralization by the reaction with a metal hydroxide.

The deactivator may be dissolved or suspended in an inert hydrocarbon solvent, or it may be as a pure solid or under molten state, before added to the reaction mixture. When an inert hydrocarbon solvent is used, it is preferred to be the same as the polymerization solvent. If a solvent different from the polymerization solvent is to be employed, it should have no deleterious effect on recycled use of the polymerization solvent.

The reaction mixture admixed with a deactivator is subjected to separation in a polymer separator of the volatile monomers or inert hydrocarbon solvent from the polymer. The volatile materials are recovered under gaseous state from the polymer separator. The deactivator is not gasified in the polymer separator but remains in the polymer. The resultant polymer may be incorporated with additives such as an antioxidant, a neutralizing agent for the catalyst, a lubricant, etc., and is finally pelletized through an extruder.

By use of the deactivator of the present invention, the following effects can be obtained:

(1) The catalyst is deactivated, whereby the polymerization is rapidly terminated. By this termination, the runaway polymerization reaction in which no control of unaltered monomers is possible in the polymer separator can be prevented to suppress formation of low molecular weight polymers (e.g. wax, grease, etc.) by post-polymerization.

(2) Undesirable side reactions, for example, formation of butene-1 through dimerization of ethylene, can be suppressed. Formation of butene-1 will lower the density of ethylene homopolymer.

(3) The monomers and the inert hydrocarbon solvent recovered from the reaction mixture can be recycled for reuse without any purification step or by passing through a simple purification step.

(4) The deactivator or the reaction product of the deactivator with the catalyst remaining in the polymer has no deleterious effect on the properties of the polymer to give a polymer excellent in color and heat stability.

In the polyethylene or ethylene-α-olefin copolymer of the present invention, it is of course possible to add conventional additives such as stabilizer, UV-absorber, antistatic agent, antiblocking agent, lubricant, pigment, inorganic or organic filler, a small amount of polymer such as rubber or others. Examples of these additives may include BHT; Ionox 330 (Shell Co.); Goodrite 3114 (Goodrich Co.); Irganox 1010, 1076, Tinuvin 327 (Ciba-Geigy Co.); Weston 618 (Borgwarner Co.); LS 770, LS 622 (Sankyo Co.); DMTP, DLTP, calcium stearate, hydrotalcite, basic magnesium carbonate, erucamide, oleamide, titanium white, calcium carbonate, carbon black, talc; styrene-butadiene rubber, ethylene-vinyl acetate copolymer, high pressure method polyethylene, ethylene-propylene rubber, polypropylene; and others.

The process of the present invention is described by referring to the following Examples, by which the present invention is not limited at all.

Synthesis of Solid Catalyst A

An autoclave was flushed with dry nitrogen to remove oxygen and moisture contained therein, followed by charging with 1.6 liter of 0.5 mol/l trichlorosilane solution in hexane and 1.2 liter of hexane, and the mixture was heated to 70° C. Then, 0.45 liter of $Al_{0.15}Mg(n-Bu)_{1.75}(On-Bu)_{0.7}$ (octane solution with metal concentration of 0.9 mol/liter) and 0.35 liter of hexane were introduced at 70° C. over one hour.

Further, 0.6 liter of hexane containing 0.7 g of $TiCl_4$ was introduced, and the reaction was carried out at 70° C. for one hour. The inert solid formed is called as Catalyst A. The titanium (Ti) content in Catalyst A was measured to be 0.5% by weight.

Preparation of $Al_{0.15}Mg(n-Bu)_{1.75}(On-Bu)_{0.7}$ employed above was conducted following the procedure disclosed in Japanese Laid-open Patent Publication No. 5709/1982.

Synthesis of Solid Catalyst B

Synthesis was performed similarly as in A by use of 400 mmol of $Al_{0.15}Mg(n-Bu)_{1.75}(On-Bu)_{0.7}$, 400 mmol of trichlorosilane, 8.8 mmol of vanadyl trichloride and 12 mmol of titanium tetrachloride. The total content of vanadium (V) and titanium (Ti) in the Catalyst B was found to be 2.0%.

Synthesis of Solid Catalyst C

A flask of 500 ml capacity equipped with two dropping funnels was replaced with dry nitrogen to remove oxygen and moisture contained therein, and 160 ml of hexane was charged into the flask, followed by cooling to $-10°$ C. Then, 80 ml of a heptane solution containing 40 mmol as an organic magnesium component an organic magnesium-aluminum compound with a composition of $AlMg_{5.8}(n-C_4H_9)_{14.5}(On-C_4H_9)_{0.4}$ and 80 ml of a hexane solution containing 60 mmol of n-butoxytitanium trichloride were sampled into the dropping funnels, respectively, and the both solutions were added at the same time at $-10°$ C. under stirring over one hour, followed further by aging at the same temperature to carry out the reaction for 3 hours. The hydrocarbon insoluble solid formed was isolated, washed with n-hexane and dried to obtain 11.2 g of a solid product. The content of Ti was found to be 21% by weight. Synthesis of $AlMg_{5.8}(n-C_4H_9)_{14.5}(On-C_4H_9)$ 0.4 employed in the above synthesis was conducted according to Example 1 in Japanese Laid-open Patent Publication No. 47409/1981.

Synthesis of Solid Catalyst D

Eighty (80) ml of a heptane solution containing 40 mmol as an organic magnesium component an organic magnesium-aluminum compound with a composition of $AlMg_3(C_2H_5)_{1.5}(n-C_4H_9)_6(OSiH.CH_3.C_2H_5)_{1.5}$ and 80 ml of a heptane solution containing 40 mmol of titanium tetrachloride were sampled each into respective dropping funnels, and the both solutions added at the same time therefrom into a flask of 500 ml capacity replaced with nitrogen containing 160 ml of hexane at 0° C. under stirring over one hour, followed further by aging at the same temperature to carry out the reaction for 3 hours. The product was filtered, washed with heptane to obtain a solid product. Subsequently, to 100 ml of an octane slurry containing the solid reaction product was added 300 mmcl of a titanium compound with a composition of $TiCl_{3.5}(On-C_4H_9)_{0.5}$, and the reaction was carried out at 130° C. for 3 hours to obtain 12.2 g of a solid catalyst [D]. The content of Ti was found to be 19.8% by weight. The above organic magnesium-aluminum compound was synthesized according to the Example in Japanese Laid-open Patent Publication No. 59806/1981.

EXAMPLES 1–9

Comparative Example 1–4

Into a polymerization reactor having a capacity of 100 liter, equipped with a stirrer, were fed each continuously 1.0 g/Hr of the solid Catalyst A, 200 liter/Hr of 0.1 mmol/liter triethylaluminum solution in cyclohexane (20 mmol/Hr of triethylaluminum), 25 Kg/Hr of ethylene and 1 Kg/Hr of hydrogen, and polymerization was carried out at a polymerization temperature of 200° C. under a pressure of 80 $Kg/cm^2$. Polymerization conversion of ethylene was about 80%, and polyethylene was yielded at a rate of about 20 Kg/Hr.

The deactivator was prepared as a 2 wt. % solution or slurry in cyclohexane, which was continuously added into the reaction mixture after it emerged from the polymerization reactor. The reaction mixture deactivated was heated through a heat exchanger once up to 250° C., then the pressure was lowered by means of a stainless steel needle valve to 1 $Kg/cm^2$, whereupon the mixture was introduced into a separator. From the top of the separator, gaseous unaltered monomers and cyclohexane were recovered continuously and the cyclohexane slurry of the polymer cooled to room temperature was withdrawn continuously from the bottom of the separator. The polymer slurry was separated into the polymer and cyclohexane by means of a centrifugal machine, and the polymer was pelletized by feeding through a vent type extruder. The resultant pellets were crushed, dried in vacuo to remove completely volatiles, and thereafter subjected to measurement of the basic properties of the polymer.

After initiation of polymerization, when polymerization had been stabilized, ethylene and cyclohexane recovered from the separator were commenced to be recycled continuously for reuse in polymerization without subjecting to distillation purification, which recycle was conducted continuously for 4 hours. Fresh ethylene or cyclohexane was added to make up for shortage in necessary amount of ethylene or cyclohexane resulting from their recovery alone.

The productivity [polymer yield (g) per 1 g of solid catalyst] of the solid Catalyst A was measured when polymerization had been stabilized after initiation of polymerization and also at 4 hours thereafter.

From this result, it can be judged to what extent the deactivator has deleterious influence on recycled use of ethylene and cyclohexane.

The density of polyethylene during stabilized polymerization and at 4 hours thereafter was also measured. Density is lowered when butene-1 is formed by side reaction, and therefore it is possible to judge the extent of byproduced butene-1 by the change in density. Table 1 shows the structures of 8 kinds of deactivators and Table 2 shows the test results therefor.

TABLE 1

| Name of deactivator | Polymer structure | Content of methacrylic acid ester wt. % | (mole %) | Content of acrylic acid ester wt. % | (mole %) | Melt index |
|---|---|---|---|---|---|---|
| A-1 | Ethylene-methyl methacrylate copolymer | 24 | (8) | 0 | (0) | 20 |
| B-1 | Ethylene-methyl methacrylate copolymer | 18 | (6) | 0 | (0) | 5 |
| C-1 | Ethylene-methyl methacrylate copolymer | 9.8 | (3) | 0 | (0) | 15 |
| D-1 | Ethylene-ethyl methacrylate copolymer | 23 | (7) | 0 | (0) | 40 |
| E-1 | Ethylene-ethyl methacrylate copolymer | 14 | (4) | 0 | (0) | 15 |
| F-1 | Ethylene-methyl methacrylate-ethyl acrylate ternary copolymer | 18 | (7) | 18 | (6) | 30 |

TABLE 1-continued

| Name of deactivator | Polymer structure | Properties of deactivators | | | | Melt index |
|---|---|---|---|---|---|---|
| | | Content of methacrylic acid ester | | Content of acrylic acid ester | | |
| | | wt. % | (mole %) | wt. % | (mole %) | |
| G-1 | Ethylene-decyl methacrylate copolymer | 16 | (2) | 0 | (0) | 16 |
| H-1 | Ethylene-octadecyl methacrylate copolymer | 28 | (3) | 0 | (0) | 20 |

TABLE 2

| | Kind of deactivator | Amount of* deactivator g/Hr | | Polymer during stabilized polymerization | | | | | | Polymer 4 hours after commencement of recycled use | |
|---|---|---|---|---|---|---|---|---|---|---|---|
| | | | | MI | Density | MW/MN of GPC | Proportion of molecular weight of 5,000 and less (%) | Color L, | b | Productivity (g/g) | Density | Productivity (g/g) |
| Example | | | | | | | | | | | | |
| 1 | A-1 | 33 | (80) | 2.0 | 0.964 | 3.3 | 3.1 | 76 | −1.5 | 21,000 | 0.964 | 21,000 |
| 2 | A-1 | 82 | (200) | 2.1 | 0.965 | 3.3 | 2.6 | 77 | −2.0 | 22,000 | 0.965 | 20,000 |
| 3 | B-1 | 43 | (80) | 2.0 | 0.965 | 3.3 | 2.8 | 76 | −2.3 | 21,000 | 0.965 | 21,000 |
| 4 | C-1 | 80 | (80) | 1.8 | 0.964 | 3.4 | 2.6 | 77 | −2.4 | 22,000 | 0.964 | 21,000 |
| 5 | D-1 | 39 | (80) | 2.1 | 0.965 | 3.5 | 2.8 | 75 | −3.1 | 21,000 | 0.965 | 21,000 |
| 6 | E-1 | 63 | (80) | 2.2 | 0.965 | 3.2 | 2.9 | 76 | −1.9 | 22,000 | 0.965 | 22,000 |
| 7 | F-1 | 43 | (80) | 2.1 | 0.965 | 3.4 | 2.5 | 77 | −1.9 | 22,000 | 0.965 | 21,000 |
| 8 | G-1 | 50 | (80) | 2.3 | 0.964 | 3.3 | 2.4 | 78 | −2.0 | 21,000 | 0.964 | 21,000 |
| 9 | H-1 | 29 | (80) | 2.2 | 0.965 | 3.4 | 2.5 | 77 | −1.6 | 21,000 | 0.965 | 21,000 |
| Comparative example | | | | | | | | | | | | |
| 1 | Not used | 0 | | 3.2 | 0.962 | 4.8 | 10.0 | 77 | +2.0 | 22,000 | 0.951 | 16,000 |
| 2 | Methanol | 40 | | 2.0 | 0.964 | 3.3 | 2.5 | 77 | +0.5 | 21,000 | (NP)** | (NP)** |
| 3 | A-1 | 2 | (5) | 2.7 | 0.962 | 4.0 | 5.3 | 78 | −2.0 | 20,000 | 0.959 | 18,000 |
| 4 | C-1 | 800 | (800) | 2.0 | 0.963 | 4.0 | 2.6 | 75 | −1.0 | 21,000 | 0.959 | 20,000 |

*Numeral in the bracket indicates moles supplied of ester units in the deactivator (mmol/Hr)
**NP = Not polymerized As apparently seen from the results in Table 2, when no deactivator is used (Comparative example 1), the amount of low molecular weight polymers formed is increased, whereby the molecular weight distribution (MW/MN) is broadened to lower the productivity and the density 4 hours after recycled use.

When methanol was used as the deactivator (Comparative example 2), a polymer having normal characteristics could be obtained during stabilized polymerization, but the activity was abruptly lowered when unaltered ethylene and the solvent cyclohexane were commenced to be recycled, until 4 hours after recycled use, polymerization was completely terminated.

On the other hand, when the copolymer of ethylene with a methacrylic acid ester or a copolymer of ethylene with a methacrylic acid ester and an acrylic acid ester of the present invention was used as the deactivator (Examples 1 to 9), there could be obtained a polymer having a sharp molecular weight distribution and a good color, with no lowering in density and productivity observed even after recycled use of unaltered ethylene and the solvent cyclohexane. When the amount of the deactivator is too small (Comparative example 3), the molecular weight distribution is broadened, while the density of the resin obtained is lowered when the amount of the deactivator is too much (Comparative example 4).

EXAMPLE 10

Into a polymerization reactor of 100 liter capacity equipped with a stirrer were each continuously charged 1.3 g/Hr of the solid Catalyst A, 200 liter/Hr of 0.1 mmol/liter triethylaluminum solution in cyclohexane (20 mmol/Hr of triethylaluminum), 20 Kg/Hr of ethylene and 10 Kg/Hr of butene-1, and polymerization was carried out at a polymerization temperature of 200° C. under a pressure of 80 Kg/cm². Polymerization conversion of ethylene was about 85%, and the ethylene-butene-1 copolymer was yielded at a rate of about 18 Kg/Hr. The reaction mixture was treated similarly as in Example 1. The results are shown in Table 3.

TABLE 3

| | Kind of deactivator | Amount of* deactivator g/Hr | | Polymer during stabilized polymerization | | | | | | Polymer 4 hours after commencement of recycled use | |
|---|---|---|---|---|---|---|---|---|---|---|---|
| | | | | MI | Density | MW/MN of GPC | Proportion of molecular weight of 5,000 and less (%) | Color L, | b | Productivity (g/g) | Density | Productivity (g/g) |
| Example | | | | | | | | | | | | |
| 10 | A-1 | 33 | (80) | 3.1 | 0.922 | 3.5 | 2.4 | 69 | −1.5 | 14,000 | 0.922 | 14,000 |
| 11 | A-1 | 33 | (80) | 2.4 | 0.920 | 3.0 | 2.8 | 70 | −1.8 | 14,000 | 0.921 | 14,000 |
| 12 | B-1 | 43 | (80) | 1.6 | 0.962 | 3.4 | 2.7 | 76 | −3.1 | 23,000 | 0.962 | 23,000 |
| 13 | B-1 | 43 | (80) | 3.3 | 0.922 | 3.3 | 2.7 | 71 | −2.8 | 15,000 | 0.922 | 15,000 |
| 14 | B-1 | 43 | (80) | 3.2 | 0.922 | 3.2 | 3.0 | 70 | −4.1 | 14,000 | 0.922 | 14,000 |
| 15 | B-1 | 6 | (12) | 2.6 | 0.964 | 3.2 | 2.6 | 76 | −3.0 | 25,000 | 0.963 | 25,000 |
| Comparative example 5 | Not used | 0 | | 4.6 | 0.965 | 5.1 | 16.1 | 73 | +0.2 | 25,000 | 0.954 | 15,000 |

TABLE 3-continued

| | | Amount of* deactivator | | | Polymer during stabilized polymerization | | | | | Polymer 4 hours after commencement of recycled use | |
|---|---|---|---|---|---|---|---|---|---|---|---|
| | Kind of deactivator | | MI | Density | MW/MN of GPC | Proportion of molecular weight of 5,000 and less (%) | Color L. | b | Productivity (g/g) | Density | Productivity (g/g) |
| Example 16 | A-1 | 5 (12) | 3.5 | 0.920 | 3.5 | 2.5 | 76 | −2.2 | 23,000 | 0.920 | 23,000 |

*Numeral in the bracket indicates moles supplied of ester units in the deactivator (mmol/Hr).

EXAMPLE 11

Example 10 was repeated except that 12 Kg/Hr of octene-1 was fed in place of butene-1, to obtain an ethylene-octene-1 copolymer. The results obtained are shown in Table 3.

EXAMPLE 12

Polymerization was carried out in the same manner as in Example 1 except for using the solid Catalyst B in place of the solid Catalyst A to obtain a polyethylene. The results obtained are shown in Table 3.

EXAMPLE 13

Polymerization was carried out in the same manner as in Example 10 except for using the solid Catalyst C in place of the solid Catalyst A to obtain an ethylene-butene-1 copolymer. The results obtained are shown in Table 3.

EXAMPLE 14

Polymerization was carried out in the same manner as in Example 11 except for using the solid Catalyst D in place of the solid Catalyst A to obtain an ethylene-octene-1 copolymer. The results obtained are shown in Table 3.

EXAMPLE 15

Polymerization of ethylene was carried out in an autoclave of 2 liter capacity equipped with a stirrer. Under a polymerization pressure of 1,200 Kg/cm$^2$ and a reaction temperature of 220° C., ethylene was fed at a rate of 40 Kg/Hr, the solid catalyst [A] at 0.15 g/Hr, triethylaluminum at 3.0 mmol/Hr, respectively, into the reactor. Polyethylene was yielded at a rate of 3.8 Kg/Hr. The deactivator, in the form of a mixture with a mineral oil with an average boiling point of 150° C., was added continuously to the reaction mixture after it emerged from the reactor. The reaction mixture deactivated was led to a separation system in which a medium pressure separator maintained at 250 Kg/cm$^2$ and a low pressure separator maintained at 10 Kg/cm$^2$ were connected in series, wherein unaltered ethylene was separated from the polymer. The properties of the polymers obtained during stabilized polymerization and 4 hours after recycled use of unaltered ethylene are shown in Table 3.

Comparative Example 5

Example 15 was repeated except that no deactivator was used to obtain a polyethylene. The polyethylene obtained had the properties as shown in Table 3.

EXAMPLE 16

By use of a tubular reactor of 5 mm in diameter and 40 m in length, polymerization was carried out under a pressure of 1000 Kg/cm$^2$ at a temperature of 260° C.

Ethylene was fed at a rate of 16 Kg/Hr, butene-1 at 24 Kg/Hr, the solid catalyst [B] at 0.15 g/Hr and triethylaluminum at 3.0 mmol/Hr, respectively, into the reactor. Polyethylene was yielded at a rate of 3.5 Kg/Hr. The steps of addition of the deactivator et seq were the same as in Example 15. The results obtained are shown in Table 3.

EXAMPLES 17-26

Comparative Examples 6-9

Into a polymerization reactor having a capacity of 100 liter, equipped with a stirrer, were fed each continuously 1.0 g/Hr of the solid Catalyst A, 200 liter/Hr of 0.1 mmol/liter triethylaluminum solution in cyclohexane (20 mmol/Hr of triethylaluminum), 25 Kg/Hr of ethylene and 1 Kg/Hr of hydrogen, and polymerization was carried out at a polymerization temperature of 200° C. under a pressure of 80 Kg/cm$^2$. Polymerization conversion of ethylene was about 80%, and polyethylene was yielded at a rate of about 20 Kg/Hr.

The deactivator was prepared as a 2 wt. % solution or slurry in cyclohexane, which was continuously added into the reaction mixture after it emerged from the polymerization reactor. The reaction mixture deactivated was heated through a heat exchanger once up to 250° C., then the pressure was lowered by means of a stainless steel needle valve to 1 Kg/cm$^2$, whereupon the mixture was introduced into a separator. From the top of the separator, gaseous unaltered monomers and cyclohexane were recovered continuously and the cyclohexane slurry of the polymer cooled to room temperature was withdrawn continuously from the bottom of the separator. The polymer slurry was separated into the polymer and cyclohexane by means of a centrifugal machine, and the polymer was pelletized by feeding through a vent type extruder. The resultant pellets were crushed, dried in vacuo to remove completely volatiles, and thereafter subjected to measurement of the basic properties of the polymer.

After initiation of polymerization, when polymerization had been stabilized, ethylene and cyclohexane recovered from the separator were commenced to be recycled continuously for reuse in polymerization without subjecting to distillation purification, which recycle was conducted continuously for 4 hours. Fresh ethylene or cyclohexane was added to make up for shortage in necessary amount of ethylene or cyclohexane resulting from their recovery alone.

The productivity [polymer yield (g) per 1 g of solid catalyst] of the solid Catalyst A was measured when polymerization had been stabilized after initiation of polymerization and also at 4 hours thereafter.

From this result, it can be judged to what extent the deactivator has deleterious influence on recycled use of ethylene and cyclohexane.

The density of polyethylene during stabilized polymerization and at 4 hours thereafter was also measured. Density is lowered when butene-1 is formed by side reaction, and therefore it is possible to judge the extent of by-produced butene-1 by the change in density. Table 4 shows the structures of 9 kinds of deactivators and Table 5 shows the test results therefor.

TABLE 4

| Properties of deactivator | | | | | |
|---|---|---|---|---|---|
| Name of deactivator | Polymer structure | Content of acrylic acid ester wt. % | (mole %) | Melt index | Density |
| A-2 | Ethylene/ethyl acrylate | 20 | (7.7) | 21 | 0.93 |
| B-2 | " | 18 | (6.7) | 7 | 0.93 |
| C-2 | " | 8 | (2.9) | 13 | 0.94 |
| D-2 | Ethylene/methyl acrylate | 20 | (9.2) | 43 | 0.93 |
| E-2 | " | 10 | (4.1) | 20 | 0.93 |
| F-2 | Ethylene/butyl acrylate | 20 | (6.5) | 30 | 0.93 |
| G-2 | Ethylene/ethyl-2-ethyl acrylate | 20 | (6.5) | 26 | 0.93 |
| H-2 | Ethylene/octadecyl acrylate | 20 | (2.2) | 35 | 0.93 |
| I-2 | Ethylene/decyl 2-pentyl acrylate | 20 | (2.5) | 24 | 0.93 | tion, but the activity was abruptly lowered when unaltered ethylene and the solvent cyclohexane were commenced to be recycled, until 4 hours after recycled use, polymerization was completely terminated.

On the other hand, when the copolymer of ethylene with an alkyl acrylate of the present invention was used as the deactivator (Examples 17 to 26), there could be obtained a polymer having a sharp molecular weight distribution and a good color, with no lowering in density and productivity observed even after recycled use of unaltered ethylene and the solvent cyclohexane. When the amount of the deactivator is too small (Comparative example 8), the molecular weight distribution is broadened, while the density of the resin obtained is lowered when the amount of the deactivator is too much (Comparative example 9).

EXAMPLE 27

Into a polymerization reactor of 100 liter capacity equipped with a stirrer were each continuously charged 1.3 g/Hr of the solid Catalyst A, 200 liter/Hr of 0.1

TABLE 5

| | | | Polymer during stabilized polymerization | | | | | | Polymer 4 hours after commencement of recycled use | |
|---|---|---|---|---|---|---|---|---|---|---|
| | Kind of deactivator | Amount of* deactivator g/Hr | MI | Density | MW/MN of GPC | Proportion of molecular weight of 5,000 and less (%) | Color L, b | | Productivity (g/g) | Density | Productivity (g/g) |
| Example | | | | | | | | | | | |
| 17 | A-2 | 34 (880) | 2.0 | 0.965 | 3.4 | 2.5 | 77 | −2.3 | 21,000 | 0.965 | 21,000 |
| 18 | A-2 | 84 (200) | 2.0 | 0.965 | 3.3 | 2.6 | 77 | −1.5 | 20,000 | 0.964 | 20,000 |
| 19 | B-2 | 37 (80) | 2.1 | 0.964 | 3.4 | 2.7 | 76 | −1.8 | 21,000 | 0.964 | 20,000 |
| 20 | C-2 | 84 (880) | 1.8 | 0.965 | 3.3 | 2.8 | 76 | −2.0 | 21,000 | 0.965 | 21,000 |
| 21 | D-2 | 28 (80) | 2.1 | 0.964 | 3.4 | 2.8 | 77 | −3.1 | 20,000 | 0.964 | 20,000 |
| 22 | E-2 | 56 (80) | 2.2 | 0.964 | 3.2 | 2.6 | 76 | −1.8 | 21,000 | 0.965 | 20,000 |
| 23 | F-2 | 39 (80) | 2.1 | 0.965 | 3.3 | 2.9 | 78 | −1.6 | 21,000 | 0.964 | 21,000 |
| 24 | G-2 | 39 (80) | 2.0 | 0.965 | 3.3 | 2.8 | 77 | −1.7 | 21,000 | 0.965 | 21,000 |
| 25 | H-2 | 130 (80) | 2.3 | 0.964 | 3.4 | 2.4 | 76 | −1.9 | 21,000 | 0.964 | 20,000 |
| 26 | I-2 | 113 (80) | 2.2 | 0.965 | 3.4 | 2.5 | 76 | −1.4 | 21,000 | 0.965 | 21,000 |
| Comparative example | | | | | | | | | | | |
| 6 | Not used | 0 | 3.2 | 0.962 | 4.8 | 10.0 | 77 | +2.0 | 22,000 | 0.951 | 16,000 |
| 7 | Methanol | 40 mmol/Hr | 2.0 | 0.964 | 3.3 | 2.5 | 77 | +0.5 | 21,000 | (NP**) | (NP) |
| 8 | A-2 | 2 (5) | 2.8 | 0.965 | 4.0 | 5.3 | 77 | −1.9 | 20,000 | 0.959 | 19,000 |
| 9 | C-2 | 630 (600) | 2.0 | 0.963 | 3.7 | 2.6 | 72 | −1.0 | 21,000 | 0.963 | 18,000 |

*Numeral in the bracket indicates moles supplied of ester units in the deactivator (mmol/Hr).
**NP = Not polymerized As apparently seen from the results in Table 5, when no deactivator is used (Comparative example 6), the amount of low molecular weight polymers formed is increased, whereby the molecular weight distribution (MW/MN) is broadened to lower the productivity and the density 4 hours after recycled use.

When methanol was used as the deactivator (Comparative example 7), a polymer having normal characteristics could be obtained during stabilized polymerizammol/liter triethylaluminum solution in cyclohexane (20 mmol/Hr of triethylaluminum), 20 Kg/Hr of ethylene and 10 Kg/Hr of butene-1, and polymerization was carried out at a polymerization temperature of 200° C. under a pressure of 80 Kg/cm². Polymerization conversion of ethylene was about 85%, and the ethylene-butene-1 copolymer was yielded at a rate of about 18 Kg/Hr. The reaction mixture was treated similarly as in Example 17. The results are shown in Table 6.

TABLE 6

| | | | Polymer during stabilized polymerization | | | | | | Polymer 4 hours after commencement of recycled use | |
|---|---|---|---|---|---|---|---|---|---|---|
| | Kind of deactivator | Amount of* deactivator g/Hr | MI | Density | MW/MN of GPC | Proportion of molecular weight of 5,000 and less (%) | Color L, b | | Productivity (g/g) | Density | Productivity (g/g) |
| Example | | | | | | | | | | | |
| 27 | A-2 | 34 (80) | 3.0 | 0.923 | 3.5 | 2.4 | 70 | −1.6 | 14,000 | 0.922 | 14,000 |
| 28 | A-2 | 34 (80) | 2.3 | 0.922 | 3.0 | 2.8 | 70 | −1.9 | 15,000 | 0.922 | 14,000 |
| 29 | B-2 | 37 (80) | 1.6 | 0.962 | 3.4 | 2.7 | 76 | −3.1 | 23,000 | 0.961 | 22,000 |
| 30 | B-2 | 37 (80) | 3.3 | 0.922 | 3.4 | 2.7 | 70 | −2.8 | 15,000 | 0.920 | 16,000 |
| 31 | B-2 | 37 (80) | 3.2 | 0.921 | 3.3 | 2.9 | 70 | −4.1 | 15,000 | 0.920 | 14,000 |
| 32 | B-2 | 6 (12) | 2.6 | 0.965 | 3.2 | 2.6 | 76 | −3.6 | 25,000 | 0.965 | 24,000 |
| Comparative | Not used | 0 | 4.6 | 0.965 | 5.1 | 16.1 | 73 | +0.2 | 25,000 | 0.954 | 15,000 |

TABLE 6-continued

| | Kind of deactivator | Amount of* deactivator g/Hr | | Polymer during stabilized polymerization | | | | | Produc- tivity (g/g) | Polymer 4 hours after commencement of recycled use | |
|---|---|---|---|---|---|---|---|---|---|---|---|
| | | | MI | Density | MW/MN of GPC | Proportion of molecular weight of 5,000 and less (%) | Color L. | b | | Density | Productivity (g/g) |
| example 10 Example 33 | A-2 | 6 (12) | 3.5 | 0.920 | 3.5 | 2.5 | 70 | −2.2 | 23,000 | 0.920 | 23,000 |

*Numeral in the bracket indicates moles supplied of ester units in the deactivator (mmol/Hr).

EXAMPLE 28

Example 27 was repeated except that 12 Kg/Hr of octene-1 was fed in place of butene-1, to obtain an ethylene-octene-1 copolymer. The results obtained are shown in Table 6.

EXAMPLE 29

Polymerization was carried out in the same manner as in Example 17 except for using the solid Catalyst B in place of the solid Catalyst A to obtain a polyethylene. The results obtained are shown in Table 6.

EXAMPLE 30

Polymerization was carried out in the same manner as in Example 27 except for using the solid Catalyst C in place of the solid Catalyst A to obtain an ethylene-butene-1 copolymer. The results obtained are shown in Table 6.

EXAMPLE 31

Polymerization was carried out in the same manner as in Example 28 except for using the solid Catalyst D in place of the solid Catalyst A to obtain an ethylene-octene-1 copolymer. The results obtained are shown in Table 6.

EXAMPLE 32

Polymerization of ethylene was carried out in an autoclave of 2 liter capacity equipped with a stirrer. Under a polymerization pressure of 1,200 Kg/cm$^2$ and a reaction temperature of 220° C., ethylene was fed at a rate of 40 Kg/Hr, the solid catalyst [A] at 0.15 g/Hr, triethylaluminum at 3.0 mmol/Hr, respectively, into the reactor. Polyethylene was yielded at a rate of 3.8 Kg/Hr. The deactivator, in the form of a mixture with a mineral oil with an average boiling point of 150° C., was added continuously to the reaction mixture after it emerged from the reactor. The reaction mixture deactivated was led to a separation system in which a medium pressure separator maintained at 250 Kg/cm$^2$ and a low pressure separator maintained at 10 Kg/cm$^2$ were connected in series, wherein unaltered ethylene was separated from the polymer. The properties of the polymers obtained during stabilized polymerization and 4 hours after recycled use of unaltered ethylene are shown in Table 6.

Comparative Example 10

Example 32 was repeated except that no deactivator was used to obtain a polyethylene. The polyethylene obtained had the properties as shown in Table 6.

EXAMPLE 33

By use of a tubular reactor of 5 mm in diameter and 40 m in length, polymerization was carried out under a pressure of 1000 Kg/cm$^2$ at a temperature of 260° C. Ethylene was fed at a rate of 16 Kg/Hr, butene-1 at 24 Kg/Hr, the solid catalyst [B] at 0.15 g/Hr and triethylaluminum at 3.0 mmol/Hr, respectively, into the reactor. Polyethylene was yielded at a rate of 3.5 Kg/Hr. The steps of addition of the deactivator et seq were the same as in Example 32. The results obtained are shown in Table 6.

EXAMPLES 34–40

Comparative Example 11–14

Into a polymerization reactor having a capacity of 100 liter, equipped with a stirrer, were fed each continuously 1.0 g/Hr of the solid Catalyst A, 200 liter/Hr of 0.1 mmol/liter triethylaluminum solution in cyclohexane (20 mmol/Hr of triethylaluminum), 25 Kg/Hr of ethylene and 1 Kg/Hr of hydrogen, and polymerization was carried out at a polymerization temperature of 200° C. under a pressure of 80 Kg/cm$^2$. Polymerization conversion of ethylene was about 80%, and polyethylene was yielded at a rate of about 20 Kg/Hr.

The deactivator was prepared as a 2 wt. % solution or slurry in cyclohexane, which was continuously added into the reaction mixture after it emerged from the polymerization reactor. The reaction mixture deactivated was heated through a heat exchanger once up to 250° C., then the pressure was lowered by means of a stainless steel needle valve to 1 Kg/cm$^2$, whereupon the mixture was introduced into a separator. From the top of the separator, gaseous unaltered monomers and cyclohexane were recovered continuously and the cyclohexane slurry of the polymer cooled to room temperature was withdrawn continuously from the bottom of the separator. The polymer slurry was separated into the polymer and cyclohexane by means of a centrifugal machine, and the polymer was pelletized by feeding through a vent type extruder. The resultant pellets were crushed, dried in vacuo to remove completely volatiles, and thereafter subjected to measurement of the basic properties of the polymer.

After initiation of polymerization, when polymerization had been stabilized, ethylene and cyclohexane recovered from the separator were commenced to be recycled continuously for reuse in polymerization without subjecting to distillation purification, which recycle was conducted continuously for 4 hours. Fresh ethylene or cyclohexane was added to make up for shortage in necessary amount of ethylene or cyclohexane resulting from their recovery alone.

The productivity [polymer yield (g) per 1 g of solid catalyst] of the solid Catalyst A was measured when polymerization had been stabilized after initiation of polymerization and also at 4 hours thereafter.

From this result, it can be judged to what extent the deactivator has deleterious influence on recycled use of ethylene and cyclohexane.

The density of polyethylene during stabilized polymerization and at 4 hours thereafter was also measured.

Density is lowered when butene-1 is formed by side reaction, and therefore it is possible to judge the extent of by-produced butene-1 by the change in density. Table 7 shows the structures of 6 kinds of deactivators and Table 8 shows the test results therefor.

TABLE 7

| Name of deactivator | Structure of copolymer Composition given in bracket (mole %) | Melt index |
|---|---|---|
| A-3 | Ethylene/methacrylic acid/sodium methacrylate (92%) (4%) (4%) | 5.0 |
| B-3 | Ethylene/methacrylic acid/sodium methacrylate (95%) (3.2%) (1.8%) | 5.2 |
| C-3 | Ethylene/sodium methacrylate (91%) (9%) | 4.3 |
| D-3 | Ethylene/methacrylic acid/zinc methacrylate (92%) (4%) (4%) | 3.5 |
| E-3 | Ethylene/2-pentylacrylic acid/ calcium 2-pentylacrylate (92%) (4%) (4%) | 3.0 |
| F-3 | Ethylene/acrylic acid/sodium acrylate (92%) (4%) (4%) | 5.0 |

When methanol was used as the deactivator (Comparative example 12), a polymer having normal characteristics could be obtained during stabilized polymerization, but the activity was abruptly lowered when unaltered ethylene and the solvent cyclohexane were commenced to be recycled, until 4 hours after recycled use, polymerization was completely terminated.

On the other hand, when the ethylenic multi-component copolymer of the present invention was used as the deactivator (Examples 34–40), there could be obtained a polymer having a sharp molecular weight distribution and a good color, with no lowering in density and productivity observed even after recycled use of unaltered ethylene and the solvent cyclohexane. When the amount of the deactivator is too small (Comparative example 13), the molecular weight distribution is broadened, while the density of the resin obtained is lowered when the amount of the deactivator is too much (Comparative example 14).

EXAMPLE 41

Into a polymerization reactor of 100 liter capacity equipped with a stirrer were each continuously charged 1.3 g/Hr of the solid Catalyst A, 200 liter/Hr of 0.1 mmol/liter triethylaluminum solution in cyclohexane (20 mmol/Hr of triethylaluminum), 20 Kg/Hr of ethylene and 10 Kg/Hr of butene-1, and polymerization was carried out at a polymerization temperature of 200° C.

TABLE 8

| | | | | Polymer during stabilized polymerization | | | | | Polymer 4 hours after commencement of recycled use | |
|---|---|---|---|---|---|---|---|---|---|---|
| | Kind of deactivator | Amount of* deactivator g/Hr | MI | Density | Proportion of molecular weight of 5,000 and Less MW/MN of GPC (%) | | Color L, b | | Productivity (g/g) | Density | Productivity (g/g) |
| Example | | | | | | | | | | | |
| 34 | A-3 | 34 (80) | 2.1 | 0.965 | 3.4 | 2.6 | 77 | −1.5 | 21,000 | 0.964 | 21,000 |
| 35 | A-3 | 84 (200) | 2.0 | 0.964 | 3.2 | 3.1 | 77 | −1.0 | 22,000 | 0.965 | 22,000 |
| 36 | B-3 | 50 (80) | 2.0 | 0.965 | 3.3 | 2.6 | 77 | −2.3 | 20,000 | 0.965 | 21,000 |
| 37 | C-3 | 31 (80) | 1.9 | 0.964 | 3.4 | 2.8 | 78 | −3.1 | 21,000 | 0.964 | 20,000 |
| 38 | D-3 | 35 (80) | 2.2 | 0.965 | 3.5 | 2.7 | 78 | −1.6 | 20,000 | 0.965 | 21,000 |
| 39 | E-3 | 38 (80) | 2.3 | 0.965 | 3.2 | 2.8 | 76 | −1.4 | 21,000 | 0.965 | 21,000 |
| 40 | F-3 | 33 (80) | 2.2 | 0.964 | 3.3 | 2.7 | 76 | −1.0 | 21,000 | 0.965 | 21,000 |
| Comparative example | | | | | | | | | | | |
| 11 | Not used | 0 | 3.2 | 0.962 | 4.8 | 10.0 | 77 | +2.0 | 22,000 | 0.951 | 16,000 |
| 12 | Methanol | 2.0 mmol/Hr | 3.3 | 0.964 | 3.3 | 2.5 | 77 | +0.5 | 21,000 | (NP**) | (NP**) |
| 13 | A-3 | 2 (5) | 2.8 | 0.963 | 4.0 | 5.1 | 77 | −1.9 | 20,000 | 0.958 | 19,000 |
| 14 | B-3 | 377 (600) | 2.0 | 0.963 | 3.1 | 2.5 | 70 | −1.0 | 21,000 | 0.963 | 18,000 |

*Numeral in the bracket indicates moles supplied of carboxylic acid and carboxylic acid and carboxylic acid metal salt units in the ethylenic multi-component copolymer (deactivator) (mmol/Hr).
**NP = Not polymerized As apparently seen from the results in Table 8, when no deactivator is used (Comparative example 11), the amount of low molecular weight polymers formed is increased, whereby the molecular weight distribution (MW/MN) is broadened to lower the productivity and the density 4 hours after recycled use.

under a pressure of 80 Kg/cm². Polymerization conversion of ethylene was about 85%, and the ethylene-butene-1 copolymer was yielded at a rate of about 18 Kg/Hr. The reaction mixture was treated similarly as in Example 34. The results are shown in Table 9.

TABLE 9

| | | | | Polymer during stabilized polymerization | | | | | Polymer 4 hours after commencement of recycled use | |
|---|---|---|---|---|---|---|---|---|---|---|
| | Kind of deactivator | Amount of* deactivator g/Hr | MI | Density | Proportion of molecular weight of 5,000 and Less MW/MN of GPC (%) | | Color L, b | | Productivity (g/g) | Density | Productivity (g/g) |
| Example | | | | | | | | | | | |
| 41 | A-3 | 34 (80) | 3.1 | 0.922 | 3.1 | 2.4 | 69 | −1.5 | 14,000 | 0.922 | 14,000 |
| 42 | A-3 | 34 (80) | 2.2 | 0.921 | 3.0 | 2.8 | 70 | −1.9 | 15,000 | 0.921 | 14,000 |
| 43 | B-3 | 50 (80) | 1.6 | 0.962 | 3.4 | 2.6 | 76 | −2.0 | 22,000 | 0.960 | 22,000 |
| 44 | B-3 | 50 (80) | 3.4 | 0.922 | 3.3 | 2.6 | 70 | −2.8 | 14,000 | 0.921 | 15,000 |

TABLE 9-continued

| | | Amount of* deactivator g/Hr | | Polymer during stabilized polymerization | | | | | | Polymer 4 hours after commencement of recycled use | |
|---|---|---|---|---|---|---|---|---|---|---|---|
| | Kind of deactivator | | | MI | Density | MW/MN of GPC | Proportion of molecular weight of 5,000 and Less (%) | Color L. | Color b | Productivity (g/g) | Density | Productivity (g/g) |
| 45 | B-3 | 50 | (80) | 3.2 | 0.921 | 3.2 | 3.0 | 70 | −4.1 | 15,000 | 0.921 | 13,000 |
| 46 | B-3 | 8 | (12) | 2.5 | 0.964 | 3.2 | 2.6 | 76 | −3.0 | 25,000 | 0.964 | 25,000 |
| Comparative example 15 | Not used | 0 | | 4.6 | 0.965 | 5.1 | 16.1 | 73 | +0.2 | 25,000 | 0.954 | 15,000 |
| Example 47 | A-3 | 8 | (12) | 3.5 | 0.920 | 3.5 | 2.5 | 71 | −2.5 | 24,000 | 0.920 | 23,000 |

*Numeral in the bracket indicates moles supplied of carboxylic acid and carboxylic acid metal salt units in the ethylenic multi-component copolymer (deactivator) (mmol/Hr).

EXAMPLE 42

Example 41 was repeated except that 12 Kg/Hr of octene-1 was fed in place of butene-1, to obtain an ethylene-octene-1 copolymer. The results obtained are shown in Table 9.

EXAMPLE 43

Polymerization was carried out in the same manner as in Example 34 except for using the solid Catalyst B in place of the solid Catalyst A to obtain a polyethylene. The results obtained are shown in Table 9.

EXAMPLE 44

Polymerization was carried out in the same manner as in Example 41 except for using the solid Catalyst C in place of the solid Catalyst A to obtain an ethylene-butene-1 copolymer. The results obtained are shown in Table 9.

EXAMPLE 45

Polymerization was carried out in the same manner as in Example 42 except for using the solid Catalyst D in place of the solid Catalyst A to obtain an ethylene-octene-1 copolymer. The results obtained are shown in Table 9.

EXAMPLE 46

Polymerization of ethylene was carried out in an autoclave of 2 liter capacity equipped with a stirrer. Under a polymerization pressure of 1,200 Kg/cm$^2$ and a reaction temperature of 220° C., ethylene was fed at a rate of 40 Kg/Hr, the solid catalyst [A] at 0.15 g/Hr, triethylaluminum at 3.0 mmol/Hr, respectively, into the reactor. Polyethylene was yielded at a rate of 3.8 Kg/Hr. The deactivator, in the form of a mixture with a mineral oil with an average boiling point of 150° C., was added continuously to the reaction mixture after it emerged from the reactor. The reaction mixture deactivated was led to a separation system in which a medium pressure separator maintained at 250 Kg/cm$^2$ and a low pressure separator maintained at 10 Kg/cm$^2$ were connected in series, wherein unaltered ethylene was separated from the polymer. The properties of the polymers obtained during stabilized polymerization and 4 hours after recycled use of unaltered ethylene are shown in Table 9.

Comparative Example 15

Example 46 was repeated except that no deactivator was used to obtain a polyethylene. The polyethylene obtained had the properties as shown in Table 9.

EXAMPLE 47

By use of a tubular reactor of 5 mm in diameter and 40 m in length, polymerization was carried out under a pressure of 1000 Kg/cm$^2$ at a temperature of 260° C. Ethylene was fed at a rate of 16 Kg/Hr, butene-1 at 24 Kg/Hr, the solid catalyst [B] at 0.15 g/Hr and triethylaluminum at 3.0 mmol/Hr, respectively, into the reactor. Polyethylene was yielded at a rate of 3.5 Kg/Hr. The steps of addition of the deactivator et seq were the same as in Example 46. The results obtained are shown in Table 9.

EXAMPLES 48-57

Comparative Examples 16-20

Into a polymerization reactor having a capacity of 100 liter, equipped with a stirrer, were fed each continuously 1.0 g/Hr of the solid Catalyst A, 200 liter/Hr of 0.1 mmol/liter triethylaluminum solution in cyclohexane (20 mmol/Hr of triethylaluminum), 25 Kg/Hr of ethylene and 1 Kg/Hr of hydrogen, and polymerization was carried out at a polymerization temperature of 200° C. under a pressure of 80 Kg/cm$^2$. Polymerization conversion of ethylene was about 80%, and polyethylene was yielded at a rate of about 20 Kg/Hr.

The deactivator was prepared as a 2 wt. % solution or slurry in cyclohexane, which was continuously added into the reaction mixture after it emerged from the polymerization reactor. The reaction mixture deactivated was heated through a heat exchanger once up to 250° C., then the pressure was lowered by means of a stainless steel needle valve to 1 Kg/cm$^2$, whereupon the mixture was introduced into a separator. From the top of the separator, gaseous unaltered monomers and cyclohexane were recovered continuously and the cyclohexane slurry of the polymer cooled to room temperature was withdrawn continuously from the bottom of the separator. The polymer slurry was separated into the polymer and cyclohexane by means of a centrifugal machine, and the polymer was pelletized by feeding through a vent type extruder. The resultant pellets were crushed, dried in vacuo to remove completely volatiles, and thereafter subjected to measurement of the basic properties of the polymer.

After initiation of polymerization, when polymerization had been stabilized, ethylene and cyclohexane recovered from the separator were commenced to be recycled continuously for reuse in polymerization without subjecting to distillation purification, which recycle was conducted continuously for 4 hours. Fresh ethylene or cyclohexane was added to make up for shortage in necessary amount of ethylene or cyclohexane resulting from their recovery alone.

The productivity [polymer yield (g) per 1 g of solid catalyst] of the solid Catalyst A was measured when polymerization had been stabilized after initiation of polymerization and also at 4 hours thereafter.

From this result, it can be judged to what extent the deactivator has deleterious influence on recycled use of ethylene and cyclohexane.

The density of polyethylene during stabilized polymerization and at 4 hours thereafter was also measured. Density is lowered when butene-1 is formed by side reaction, and therefore it is possible to judge the extent of by-produced butene-1 by the change in density. Table 10 shows the structures of 9 kinds of deactivators and Table 11 shows the test results therefor.

TABLE 10

| Name of deactivator* | | Content of vinyl carboxylate mole % | (wt. %) | Melt index | Density |
|---|---|---|---|---|---|
| A-4 | Suntec Q350 | 2.9 | (10) | 3.0 | 0.93 |
| B-4 | Suntec Q372 | 1.6 | (5.5) | 0.35 | 0.927 |
| C-4 | Evaflex 40 | 15.4 | (40) | 55 | 0.97 |
| D-4 | Evaflex 150 | 11.8 | (33) | 30 | 0.96 |
| E-4 | Evaflex 310 | 8.4 | (25) | 400 | 0.95 |
| F-4 | Ethylene/vinyl butyrate copolymer | 3.7 | (15) | 7.0 | 0.93 |
| G-4 | Ethylene/vinyl stearate copolymer | 5.7 | (40) | 20 | 0.93 |
| H-4 | Ethylene/α-butyl-vinyl caprate copolymer | 5.6+ | (35)+ | 25 | 0.93 |
| I-4 | Ethylene/maleic anhydride copolymer | 1.5+ | (5.0)+ | 1.1 | 0.93 |

*Suntec ® is EVA produced by Asahi Chemical Industry Co.; Evaflex is EVA produced by Mitsui Polychemical Co.
+Content of α-butylvinyl caprate mole % (wt. %) in H-4; and content of maleic anhydride in I-4.

amount of low molecular weight polymers formed is increased, whereby the molecular weight distribution (MW/MN) is broadened to lower the productivity and the density 4 hours after recycled use.

When methanol was used as the deactivator (Comparative example 17), a polymer having normal characteristics could be obtained during stabilized polymerization, but the activity was abruptly lowered when unaltered ethylene and the solvent cyclohexane were commenced to be recycled, until 4 hours after recycled use, polymerization was completely terminated.

On the other hand, when the ethylene/alkenyl carboxylate or ethylene/maleic anhydride copolymer of the present invention was used as the deactivator (Examples 48–57), there could be obtained a polymer having a sharp molecular weight distribution and a good color, with no lowering in density and productivity observed even after recycled use of unaltered ethylene and the solvent cyclohexane. When the amount of the deactivator is too small (Comparative example 18), the molecular weight distribution is broadened, while the density of the resin obtained is lowered when the amount of the deactivator is too much (Comparative example 19).

EXAMPLE 58

Into a polymerization reactor of 100 liter capacity equipped with a stirrer were each continuously charged 1.3 g/Hr of the solid Catalyst A, 200 liter/Hr of 0.1 mmol/liter triethylaluminum solution in cyclohexane (20 mmol/Hr of triethylaluminum), 20 Kg/Hr of ethylene and 10 Kg/Hr of butene-1, and polymerization was carried out at a polymerization temperature of 200° C. under a pressure of 80 Kg/cm². Polymerization conversion of ethylene was about 85%, and the ethylene-butene-1 copolymer was yielded at a rate of about 18 Kg/Hr. The reaction mixture was treated similarly as in Example 48. The results are shown in Table 12.

TABLE 11

| | Kind of deactivator | Amount of* deactivator g/Hr | | Polymer during stabilized polymerization | | | | | Productivity (g/g) | Polymer 4 hours after commencement of recycled use | |
|---|---|---|---|---|---|---|---|---|---|---|---|
| | | | MI | Density | MW/MN of GPC | Proportion of molecular weight of 5,000 and Less (%) | Color L | b | | Density | Productivity (g/g) |
| Example | | | | | | | | | | | |
| 48 | A-4 | 80 (80) | 1.9 | 0.965 | 3.3 | 2.6 | 77 | −2.2 | 21,000 | 0.965 | 21,000 |
| 49 | A-4 | 200 (200) | 2.0 | 0.964 | 3.4 | 3.2 | 77 | −2.3 | 22,000 | 0.964 | 22,000 |
| 50 | B-4 | 145 (80) | 2.0 | 0.964 | 3.4 | 2.6 | 77 | −2.0 | 20,000 | 0.965 | 21,000 |
| 51 | C-4 | 20 (100) | 1.9 | 0.965 | 3.3 | 2.8 | 78 | −1.9 | 21,000 | 0.965 | 21,000 |
| 52 | D-4 | 27 (100) | 2.0 | 0.965 | 3.4 | 2.7 | 75 | −1.8 | 20,000 | 0.964 | 21,000 |
| 53 | E-4 | 32 (100) | 2.0 | 0.965 | 3.3 | 2.6 | 76 | −3.0 | 21,000 | 0.965 | 21,000 |
| 54 | F-4 | 85 (100) | 2.1 | 0.964 | 3.4 | 2.6 | 77 | −3.2 | 22,000 | 0.964 | 22,000 |
| 55 | G-4 | 78 (100) | 2.2 | 0.965 | 3.2 | 2.8 | 76 | −1.9 | 21,000 | 0.965 | 21,000 |
| 56 | H-4 | 73 (100) | 2.0 | 0.965 | 3.3 | 2.4 | 77 | −2.2 | 21,000 | 0.965 | 21,000 |
| 57 | I-4 | 196 (100) | 2.1 | 0.965 | 3.3 | 2.8 | 78 | −1.8 | 21,000 | 0.965 | 21,000 |
| Comparative example | | | | | | | | | | | |
| 16 | Not used | 0 | 3.2 | 0.962 | 4.8 | 10.0 | 77 | +2.0 | 22,000 | 0.951 | 16,000 |
| 17 | Methanol | 40 | 2.0 | 0.964 | 3.3 | 2.5 | 77 | +0.5 | 21,000 | (NP**) | (NP**) |
| 18 | A-4 | 5 (5) | 2.8 | 0.962 | 4.0 | 5.2 | 77 | −2.0 | 20,000 | 0.959 | 18,000 |
| 19 | B-4 | 1450 (800) | 2.0 | 0.964 | 3.0 | 2.7 | 70 | +2.0 | 20,000 | 0.959 | 20,000 |

*Numeral in the bracket indicates moles supplied of vinyl carboxylate units in the deactivator (mmol/Hr); except for moles supplied of α-butylvinyl caprate units in H-4 and of maleic anhydride units in I-4 (mmol/Hr).
**NP = Not polymerized As apparently seen from the results in Table 11, when no deactivator is used (Comparative example 16), the

TABLE 12

| | Kind of deactivator | Amount of* deactivator g/Hr | | Polymer during stabilized polymerization | | | | | Productivity (g/g) | Polymer 4 hours after commencement of recycled use | |
|---|---|---|---|---|---|---|---|---|---|---|---|
| | | | | MI | Density | MW/MN of GPC | Proportion of molecular weight of 5,000 and Less (%) | Color L, b | | Density | Productivity (g/g) |
| Example | | | | | | | | | | | |
| 58 | A-4 | 80 | (80) | 3.1 | 0.922 | 3.5 | 2.1 | 69 −1.5 | 14,000 | 0.922 | 14,000 |
| 59 | A-4 | 80 | (80) | 2.4 | 0.921 | 3.0 | 2.5 | 70 −1.8 | 14,000 | 0.922 | 15,000 |
| 60 | E-4 | 32 | (100) | 1.6 | 0.962 | 3.4 | 2.3 | 76 −3.1 | 23,000 | 0.961 | 23,000 |
| 61 | E-4 | 32 | (100) | 3.4 | 0.922 | 3.2 | 2.7 | 70 −2.8 | 15,000 | 0.922 | 15,000 |
| 62 | E-4 | 32 | (100) | 3.2 | 0.923 | 3.2 | 2.6 | 70 −4.1 | 14,000 | 0.922 | 14,000 |
| 63 | E-4 | 4 | (12) | 2.5 | 0.963 | 3.2 | 2.0 | 76 −3.0 | 25,000 | 0.963 | 25,000 |
| Comparative example 21 | Not used | 0 | | 4.6 | 0.965 | 5.1 | 16.1 | 73 +0.2 | 25,000 | 0.954 | 15,000 |
| Example 64 | A-4 | 12 | (12) | 3.5 | 0.920 | 3.5 | 2.5 | 76 −2.1 | 23,000 | 0.920 | 23,000 |

*Numeral in the bracket indicates moles supplied of vinyl acetate units in the deactivator (mmol/Hr).

EXAMPLE 59

Example 58 was repeated except that 12 Kg/Hr of octene-1 was fed in place of butene-1, to obtain an ethylene-octene-1 copolymer. The results obtained are shown in Table 12.

EXAMPLE 60

Polymerization was carried out in the same manner as in Example 48 except for using the solid Catalyst B in place of the solid Catalyst A to obtain a polyethylene. The results obtained are shown in Table 12.

EXAMPLE 61

Polymerization was carried out in the same manner as in Example 58 except for using the solid Catalyst C in place of the solid Catalyst A to obtain an ethylene-butene-1 copolymer. The results obtained are shown in Table 12.

EXAMPLE 62

Polymerization was carried out in the same manner as in Example 59 except for using the solid Catalyst D in place of the solid Catalyst A to obtain an ethylene-octene-1 copolymer. The results obtained are shown in Table 12.

EXAMPLE 63

Polymerization of ethylene was carried out in an autoclave of 2 liter capacity equipped with a stirrer. Under a polymerization pressure of 1,200 Kg/cm$^2$ and a reaction temperature of 220° C., ethylene was fed at a rate of 40 Kg/Hr, the solid catalyst [A] at 0.15 g/Hr, triethylaluminum at 3.0 mmol/Hr, respectively, into the reactor. Polyethylene was yielded at a rate of 3.8 Kg/Hr. The deactivator, in the form of a mixture with a mineral oil with an average boiling point of 150° C., was added continuously to the reaction mixture after it emerged from the reactor. The reaction mixture deactivated was led to a separation system in which a medium pressure separator maintained at 250 Kg/cm$^2$ and a low pressure separator maintained at 10 Kg/cm$^2$ were connected in series, wherein unaltered ethylene was separated from the polymer. The properties of the polymers obtained during stabilized polymerization and 4 hours after recycled use of unaltered ethylene are shown in Table 12.

Comparative Example 21

Example 63 was repeated except that no deactivator was used to obtain a polyethylene. The polyethylene obtained had the properties as shown in Table 12.

EXAMPLE 64

By use of a tubular reactor of 5 mm in diameter and 40 m in length, polymerization was carried out under a pressure of 1000 Kg/cm$^2$ at a temperature of 260° C.

Ethylene was fed at a rate of 16 Kg/Hr, butene-1 at 24 Kg/Hr, the solid catalyst [B] at 0.15 g/Hr and triethylaluminum at 3.0 mmol/Hr, respectively, into the reactor. Polyethylene was yielded at a rate of 3.5 Kg/Hr. The steps of addition of the deactivator et seq were the same as in Example 63. The results obtained are shown in Table 12.

EXAMPLES 65–68

Comparative Examples 22–23

Into a polymerization reactor having a capacity of 100 liter, equipped with a stirrer, were fed each continuously 1.0 g/Hr of the solid Catalyst A, 200 liter/Hr of 0.1 mmol/liter triethylaluminum solution in cyclohexane (20 mmol/Hr of triethylaluminum), 25 Kg/Hr of ethylene and 1 Kg/Hr of hydrogen, and polymerization was carried out at a polymerization temperature of 200° C. under a pressure of 80 Kg/cm$^2$. Polymerization conversion of ethylene was about 80%, and polyethylene was yielded at a rate of about 20 Kg/Hr.

The deactivator was prepared as a 2 wt. % solution or slurry in cyclohexane, which was continuously added into the reaction mixture after it emerged from the polymerization reactor. The reaction mixture deactivated was heated through a heat exchanger once up to 250° C., then the pressure was lowered by means of a stainless steel needle valve to 1 Kg/cm$^2$, whereupon the mixture was introduced into a separator. From the top of the separator, gaseous unaltered monomers and cyclohexane were recovered continuously and the cyclohexane slurry of the polymer cooled to room temperature was withdrawn continuously from the bottom of the separator. The polymer slurry was separated into the polymer and cyclohexane by means of a centrifugal machine, and the polymer was pelletized by feeding through a vent type extruder.

After initiation of polymerization, when polymerization had been stabilized, ethylene and cyclohexane recovered from the separator were commenced to be recycled continuously for reuse in polymerization without subjecting to distillation purification, which recycle was conducted continuously for 7 days. Fresh ethylene or cyclohexane was added to make up for shortage in necessary amount of ethylene or cyclohexane resulting from their recovery alone.

The productivity [polymer yield (g) per 1 g of solid catalyst] of the solid Catalyst A was measured when polymerization had been stabilized after initiation of polymerization and also every 24 hours thereafter for 7 days.

From this result, it can be judged to what extent the deactivator has deleterious influence on recycled use of ethylene and cyclohexane.

Also, carbon monoxide (CO) and carbon dioxide ($CO_2$) contained in the vent gas from the tank (inner volume: 10 m$^3$) for recovery of ethylene and cyclohexane 7 days after commencement of recycled use were quantified. When CO or $CO_2$ is generated by pyrolysis of an deactivator, a part thereof is accumulated in cyclohexane to cause lowering in polymerization activity during recycled use. Accordingly, from the quantity of CO and $CO_2$ in the vent gas, heat stability of the deactivator can be judged. The test results for four kinds of deactivators are shown in Table 13.

(5) Resin color: L value and b value were measured according to the Hunter method by means of a color-difference meter (Color Machine Co.).

We claim:

1. A process for producing polyethylene or an ethylene-α-olefin copolymer, which comprises polymerizing ethylene or a mixture of ethylene with an α-olefin having 3 to 18 carbon atoms by use of a coordination polymerization catalyst containing a transition metal compound and an organo-metallic compound at an average polymerization temperature of 130° C. or more, deactivating said catalyst by adding a copolymer of at least one monomer selected from the group consisting of vinyl monomers having a carbonyl group represented by the formula:

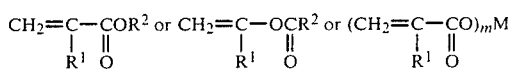

wherein $R^1$ represents a hydrogen atom or a hydrocarbon group having 1 to 5 carbon atoms; $R^2$ is a hydrogen atom or a hydrocarbon group having 1 to 20 carbon atoms; M represents a metal element; and m represents the valence of M, or maleic anhydride with ethylene to be mixed with said catalyst, the number of carbonyl groups in the deactivator being 0.4 to 20-fold of the total number of molecules of the transition metal compound and the organo-metallic compound, separating unaltered monomers from the polymer mixture, and recycling the recovered monomers to the polymerization zone.

TABLE 13

| | Kind of deactivator | Amount of* deactivator g/Hr | Productivity after commencement of recycled use (g/g) | | | | | | | | Recovery tank vent gas after 168 hrs' recycled use | | |
|---|---|---|---|---|---|---|---|---|---|---|---|---|---|
| | | | 0 hr | 24 hr | 48 hr | 72 hr | 96 hr | 120 hr | 144 hr | 168 hr | Flow rate (kg/Hr) | CO wt ppm | $CO_2$ wt ppm |
| Example | | | | | | | | | | | | | |
| 65 | A-1 | 33 (80) | 21,000 | 21,000 | 21,000 | 21,000 | 21,000 | 21,000 | 21,000 | 21,000 | 1.2 | ND** | ND |
| 66 | A-2 | 34 (80) | 21,000 | 21,000 | 21,000 | 21,000 | 21,000 | 21,000 | 21,000 | 21,000 | 1.2 | ND | ND |
| 67 | A-3 | 34 (80) | 21,000 | 21,000 | 21,000 | 21,000 | 21,000 | 21,000 | 20,000 | 20,000 | 1.1 | ND | 0.2 |
| 68 | A-4 | 80 (80) | 21,000 | 21,000 | 21,000 | 21,000 | 20,000 | 20,000 | 19,000 | 19,000 | 1.2 | ND | 0.2 |
| Comparative example | | | | | | | | | | | | | |
| 22 | Calcium stearate | 24 (80) | 20,000 | 20,000 | 19,000 | 19,000 | 18,000 | 17,000 | 16,000 | 15,000 | 1.0 | 0.9 | 2.6 |
| 23 | Zinc stearate | 25 (80) | 20,000 | 20,000 | 19,000 | 19,000 | 18,000 | 17,000 | 16,000 | 15,000 | 1.1 | 1.1 | 2.3 |

*Numeral in the bracket indicates moles supplied of carbonyl units in the deactivator (mmol/Hr).
**ND = Not detected As apparently seen from the results in Table 13, when the deactivator is a metal soap (Comparative example 22, 23), activity was gradually lowered on prolonged recycled use. And, CO and $CO_2$ were detected in the vent gas.

In contrast, when the copolymer of ethylene with a vinyl monomer having carbonyl groups of the present invention is used as the deactivator (Examples 65–68), substantially no lowering in polymerization activity was recognized even after prolonged recycled use. Moreover, no CO was generated at all, with the quantity of $CO_2$ generated being at a very low level as compared with in case of a metal soap.

The terms used in Examples have the following meanings:

(1) MI: melt index, measured according to ASTM D-1238, under the conditions of a temperature of 190° C. and a load of 2.16 Kg;

(2) Density: measured according to JIS K-6760;

(3) MW/MN: measured by means of GPC-150C (Waters Co.)

(4) Proportion of molecular weight of 5000 and less: measured by means of GPC-150C (Waters Co.);

2. A process for producing polyethylene or an ethylene-α-olefin copolymer according to claim 1, wherein the deactivator is a copolymer of ethylene with at least one monomer selected from the group consisting of acrylic acid, methacrylic acid, acrylic acid metal salts, methacrylic acid metal salts, acrylic acid esters, methacrylic acid esters, vinyl carboxylate and maleic anhydride.

3. A process for producing polyethylene or an ethylene-α-olefin copolymer according to claim 1, wherein the deactivator is a copolymer of ethylene with at least one of acrylic acid esters and methacrylic acid esters.

4. A process for producing polyethylene or an ethylene-α-olefin copolymer according to claim 1, claim 2 or claim 3, wherein the coordination polymerization catalyst employed comprises:

(A) a solid reaction product prepared by allowing an organic magnesium component soluble in a hydrocarbon solvent represented by the formula (i) $M_\alpha Mg_\beta R^1_p R^2_q X^1_r X^2_s$ [wherein M is Al, Zn, B, Be, or Li; $\beta$ is a number of 1 or more; $\alpha$, p, q, r and s each is 0 or a number greater than 0, having the relations of $p+q+r+s=m\alpha+2\beta$, and $0 \leq (r+s)/(\alpha+\beta) \leq 1.0$; m is the valence of M; $R^1$ and $R^2$ are hydrocarbon groups having 1 to 20 carbon atoms, which may be either identical or different; $X^1$ and $X^2$, which may be identical or different, represent hydrogen atoms, or groups of $OR^3$, $OSiR^4R^5R^6$, $NR^7R^8$ or $SR^9$ (wherein $R^3$, $R^7$, $R^8$ and $R^9$ represent hydrocarbon groups having 1 to 20 carbon atoms, and $R^4$, $R^5$ and $R^6$ represent hydrogen atoms or hydrocarbon groups having 1 to 20 carbon atoms)] to react with a titanium compound of the formula (ii) $Ti(OR^{10})_n X_{4-n}$ [wherein $R^{10}$ is a hydrocarbon group having 1 to 20 carbon atoms; X is a halogen; and $0 \leq n \leq 3$] at a molar ratio of the titanium compound (ii) to the organic magnesium component (i) of 1.1 to 4.0, and (B) an organic aluminum compound.

5. A process for producing polyethylene or an ethylene-$\alpha$-olefin copolymer according to claim 1, claim 2 or claim 3, wherein the coordination polymerization catalyst employed comprises:

(A) a solid catalyst prepared by allowing a solid reaction product between an organic magnesium component soluble in a hydrocarbon solvent represented by the formula (i) $M_\alpha Mg_\beta R^1_p R^2_q X^1_r X^2_s$ [wherein M is Al, Zn, B, Be, or Li; $\beta$ is a number of 1 or more; $\beta$, p, q, r and s each is 0 or a number greater than 0, having the relations of $p+g+r+s=m\alpha+2\beta$, and $0 \leq (r+s)/(\alpha+\beta) \leq 1.0$; m is the valence of M; $R^1$ and $R^2$ are hydrocarbon groups having 1 to 20 carbon atoms, which may be either identical or different; $X^1$ and $X^2$, which may be identical or different, represent hydrogen atoms, or groups of $OR^3$, $OSiR^4R^5R^6$, $NR^7R^8$ or $SR^9$ (wherein $R^3$, $R^7$, $R^8$ and $R^9$ represent hydrocarbon groups having 1 to 20 carbon atoms, and $R^4$, $R^5$ and $R^6$ represent hydrogen atoms or hydrocarbon groups having 1 to 20 carbon atoms)] and (ii) a titanium compound containing at least one halogen atom to react with at least one compound selected from the titanium and vanadium compounds represented by the formula (iii) $TiX_a(OR^{10})_{4-a}$, $VOX_b(OR^{10})_{3-b}$ and $VX_c(OR^{10})_{4-c}$ (wherein X is a halogen atom, $R^{10}$ is a hydrocarbon group having 1 to 20 carbon atoms, a is 1 to 4, b is 1 to 3 and c is 1 to 4), and (B) an organic aluminum compound.

6. A process for producing polyethylene or an ethylene-$\alpha$-olefin copolymer according to claim 1, claim 2 or claim 3, wherein the coordination polymerization catalyst employed comprises:

a catalyst component [A] having a reaction product between an organic magnesium compound soluble in a hydrocarbon solvent represented by the formula (i) $M_\alpha MgR^1_p R^2_q \cdot X^1_r X^2_s D_t$ [wherein M is a metal atom of the group I to the group III of the periodic table; $\alpha$, p, q and r each is 0 or a number greater than 0, s is greater than 0 and not greater than 1, t is a number greater than 0; having the relations of $p+q+r+s=m\alpha+2$, $0<(r+s)/(\alpha+1) \leq 1.0$ and $s \leq t$; m is the valence of M; $R^1$ and $R^2$ are hydrocarbon groups having 1 to 20 carbon atoms, which may be either identical or different; $X^1$ is a hydrogen atom or an electro-negative group containing oxygen, nitrogen or sulfur atom; $X^2$ is a halogen atom; and D is an electron donating organic compound] and (ii) one or a mixture of two or more selected from hydrogen chloride, organic halides, halides of boron, aluminum, silicon, germanium, tin, lead, phosphorus, arsenic, antimony, bismuth, zinc, cadmium and mercury to be contacted with (iii) a titanium compound or/and a vanadium compound, and

[B] an organometallic compound.

7. A process for producing polyethylene or an ethylene-$\alpha$-olefin copolymer according to claim 1, claim 2 or claim 3, wherein the coordination polymerization catalyst employed comprises a component [A] shown below and an organometallic compound [B]:

Component [A]: a solid catalyst, comprising a reaction product obtained from the reaction between (4) and (5) in the presence of (3):

(1) an organic magnesium compound represented by the formula: $M_\alpha MgR'_p X'_q D_r$ [wherein M is a metal atom of the group I to the group III of the periodic table; $\alpha$, p, q and r each is 0 or a number greater than 0, having the relations of $p+q=m\alpha+2$, $0 \leq q/(\alpha+1)<2$; m is the valence of M; R' is one kind or a mixture of two or more kinds of hydrocarbon groups having 1 to 20 carbon atoms, X' is one kind or a mixture of two or more kinds of a hydrogen atom or an electro-negative group containing oxygen, nitrogen or sulfur atom; and D is an electron donating organic compound];

(2) one kind or a mixture of two or more kinds selected from halides of boron, silicon, germanium, tin, phosphorus, antimony, bismuth and zinc or hydrogen chloride;

(3) a solid component obtained by the reaction between (1) and (2);

(4) an organometallic compound;

(5) any of the transition metal compounds of (a)-(d) shown below:

(a) titanium compound, (b) vanadium compound,
(c) titanium compound and vanadium compound, and
(d) titanium compound and zirconium compound.

8. A process for producing polyethylene or an ethylene-$\alpha$-olefin copolymer according to claim 1, claim 2 or claim 3, wherein the coordination polymerization catalyst employed comprises:

a catalyst component [A] having a reaction product between an organic magnesium compound soluble in a hydrocarbon solvent represented by the formula (i) $M_\alpha Mg_\beta R^1_p R^2_q \cdot X^1_r X^2_s D_t$ [wherein M is a metal atom of the group I to the group III of the periodic table; $\alpha$, p, q, r and s each is 0 or a number greater than 0, $\beta$ is a number greater than 0, having the relations of $p+q+r+s=m\alpha+2\beta$, $0 \leq (r+s)/(\alpha+\beta) \leq 1.0$; m is the valence of M; t is 0 or a number greater than 0; $R^1$ and $R^2$ are hydrocarbon groups having 1 to 20 carbon atoms, which may be either identical or different; $X^1$ and $X^2$ may be the same or different, and represent hydrogen atom or an electro-negative group containing oxygen, nitrogen or sulfur atom; and D is an electron donating organic compound] and (ii) one kind or a mixture of two or more kinds selected from hydrogen chloride, organic halides, halides of boron, aluminum, silicon, germanium, tin, lead, phosphorus, arsenic, antimony, bismuth, zinc, cadmium and mercury to be contacted with (iii) a titanium compound or/and a vanadium compound, and

[B] an organometallic compound.

* * * * *

UNITED STATES PATENT AND TRADEMARK OFFICE
CERTIFICATE OF CORRECTION

PATENT NO. : 4,525,546
DATED : June 25, 1985
INVENTOR(S) : Isaburo Fukawa, et al.

It is certified that error appears in the above-identified patent and that said Letters Patent is hereby corrected as shown below:

| | |
|---|---|
| 1st page, after "[21] Appl. No.:" | Delete "552,564" and substitute --552,584-- |
| Col. 12, line 48 | Delete "byproduced" and substitute --by-produced-- |

Signed and Sealed this

Tenth Day of December 1985

[SEAL]

Attest:

Attesting Officer

DONALD J. QUIGG

Commissioner of Patents and Trademarks